United States Patent [19]
Locke et al.

[11] Patent Number: 5,782,035
[45] Date of Patent: Jul. 21, 1998

[54] MULTI-PURPOSE AUTOMATIC FILLING AND LEVELING FLUID BASIN WITH WATER TRANSFER

[76] Inventors: Randal D. Locke; Daniel P. Dunbar; Teresa M. Locke, all of P.O. Box 1325, Redway, Calif. 95560-1325

[21] Appl. No.: 488,292

[22] Filed: Jun. 7, 1995

[51] Int. Cl.⁶ .................................................. A01G 31/02
[52] U.S. Cl. .......................................... 47/79; 47/81; 47/85
[58] Field of Search ................................ 47/81 S, 79 C, 47/85, 79 R, 81 R

[56] References Cited

U.S. PATENT DOCUMENTS

| | | | |
|---|---|---|---|
| 3,455,055 | 7/1969 | Chate | 47/71 |
| 3,733,746 | 5/1973 | Allen, Jr. | 47/38 |
| 3,758,987 | 9/1973 | Crane, Jr. | 47/38.1 |
| 3,775,904 | 12/1973 | Peters | 47/38.1 |
| 3,783,555 | 1/1974 | Peters | 47/38 |
| 3,871,131 | 3/1975 | Berglund | 47/38.1 |
| 3,903,644 | 9/1975 | Swift et al. | 47/38 |
| 4,052,818 | 10/1977 | Hagerty | 47/81 |
| 4,065,095 | 12/1977 | Johnson | 251/118 |
| 4,083,147 | 4/1978 | Garrick | 47/80 |
| 4,100,699 | 7/1978 | Skaife | 47/81 S |
| 4,148,155 | 4/1979 | Allen | 47/59 |
| 4,180,096 | 12/1979 | Johnson | 137/403 |
| 4,183,175 | 1/1980 | Magee | 47/79 |
| 4,198,784 | 4/1980 | Sukert | 47/79 |
| 4,299,054 | 11/1981 | Ware | 47/81 S |
| 4,324,070 | 4/1982 | Swisher | 47/81 |
| 4,329,815 | 5/1982 | Secrest | 47/80 |
| 4,344,251 | 8/1982 | Edling | 47/80 |
| 4,356,665 | 11/1982 | de Oliveira | 47/80 |
| 4,369,598 | 1/1983 | Beckwith | 47/81 S |
| 4,527,354 | 7/1985 | Selier | 47/81 |
| 4,546,571 | 10/1985 | Scrivens | 47/81 |
| 4,557,071 | 12/1985 | Fah | 47/81 |
| 4,829,709 | 5/1989 | Centafanti | 47/81 S |
| 4,937,972 | 7/1990 | Freitus | 47/62 |
| 5,020,261 | 6/1991 | Lishman | 47/79 |
| 5,341,596 | 8/1994 | Kao | 47/79 |
| 5,412,907 | 5/1995 | Anderson | 47/85 |

FOREIGN PATENT DOCUMENTS

| | | | |
|---|---|---|---|
| 109632 | 8/1966 | Norway | 47/79 C |
| 673076 | 2/1990 | Switzerland | 47/79 C |
| 2095083 | 9/1982 | United Kingdom | 47/79 C |

*Primary Examiner*—Terry Lee Melius
*Assistant Examiner*—Joanne C. Downs
*Attorney, Agent, or Firm*—Millen, White, Zelano & Branigan, P.C.

[57] ABSTRACT

A multi-purpose automatic filing basin is provided for containing a selected amount of water which is used for various purposes. The water may be transferred from the basin by wicks or by a pump to water using devices such as plant pots or toys or may be provided for direct use from the basin for devices such as animal feeders and habitats. The basin is kept supplied with water from a pressurized source by a specialized valve which opens in response to a drop in water level below a first selected level and closes in response to the water level reaching a second selected level.

28 Claims, 32 Drawing Sheets

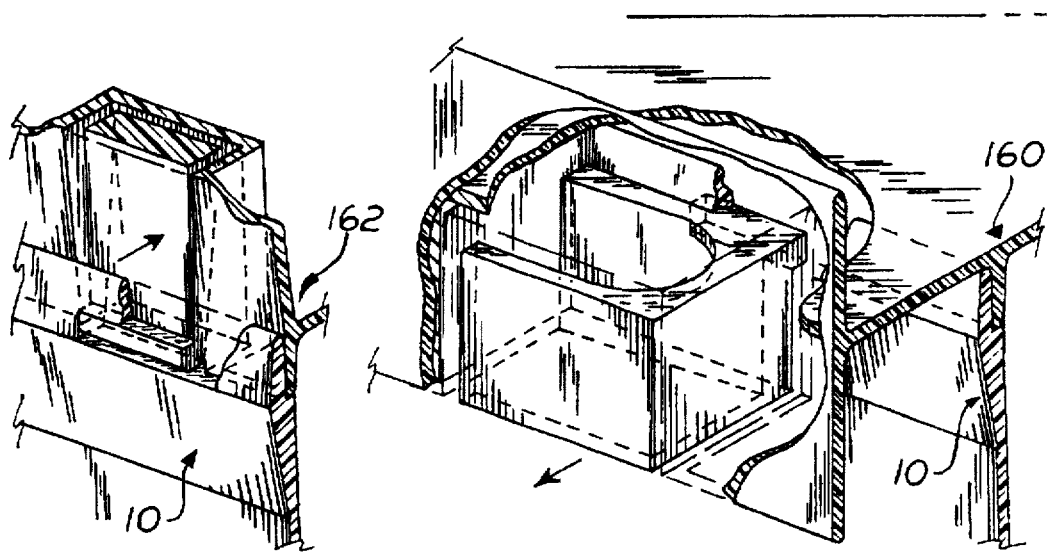
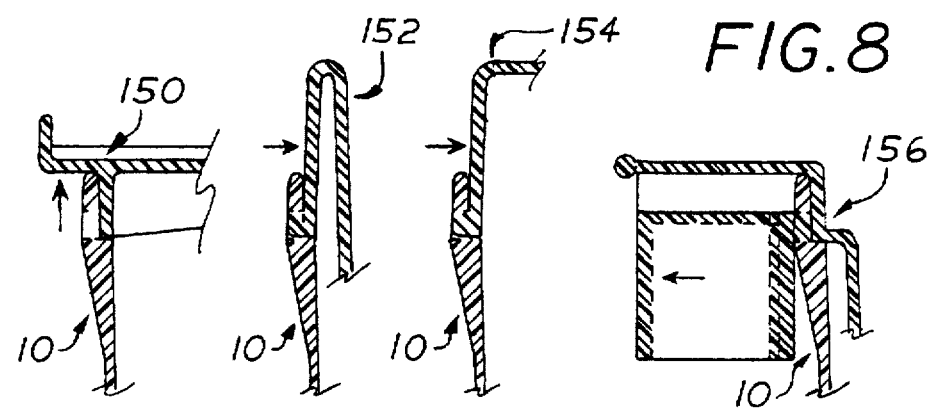
FIG. 8
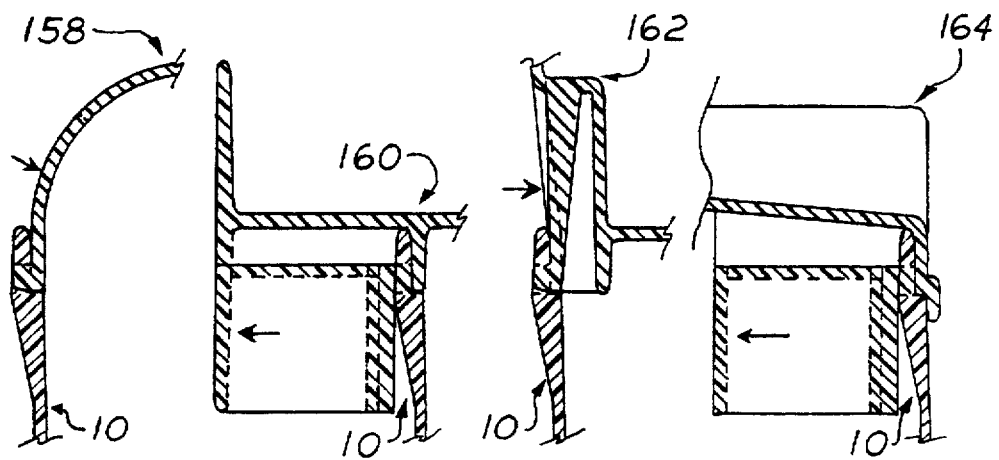

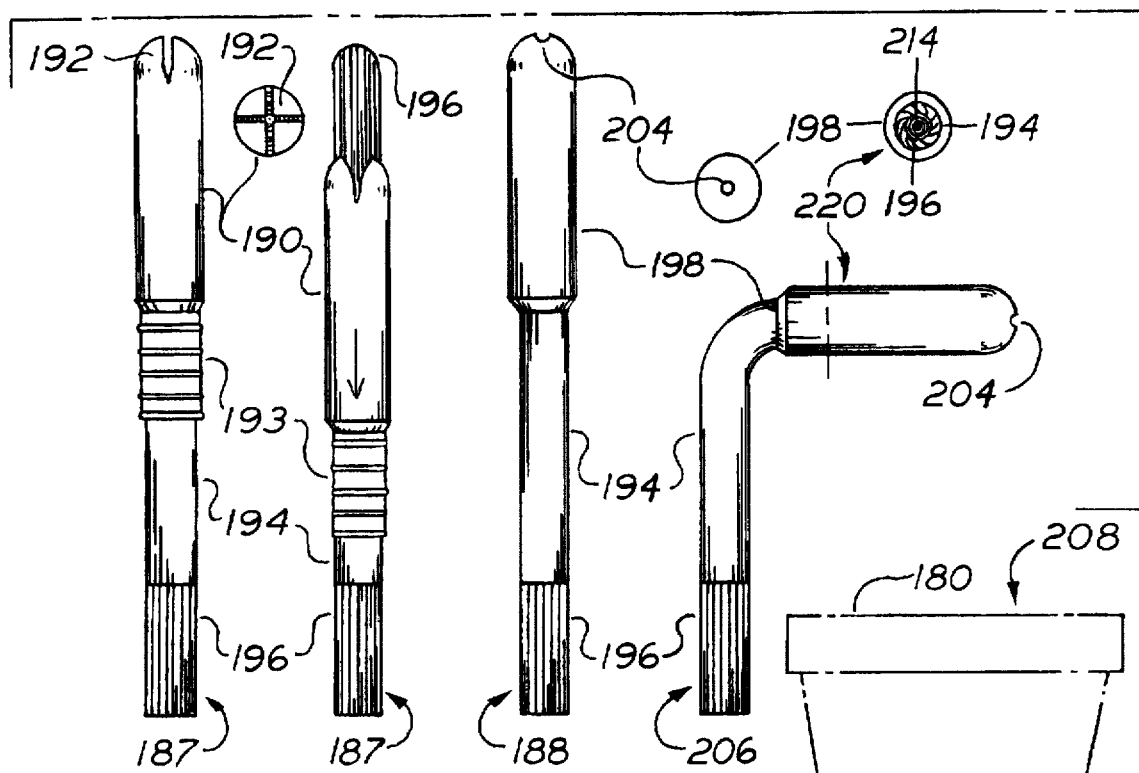
FIG. 16
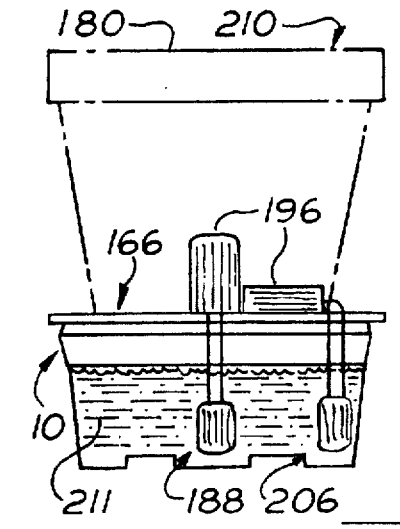
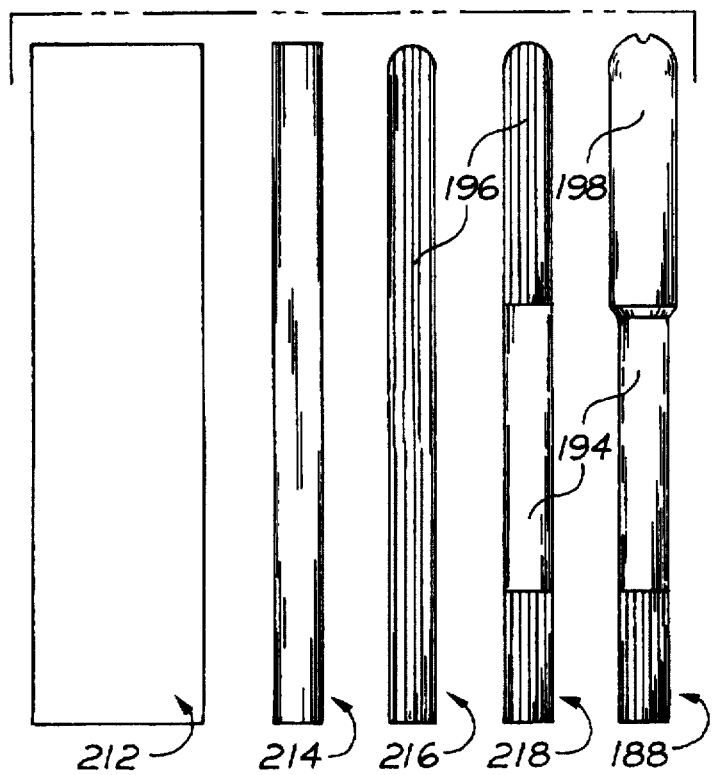
FIG. 18
FIG. 17

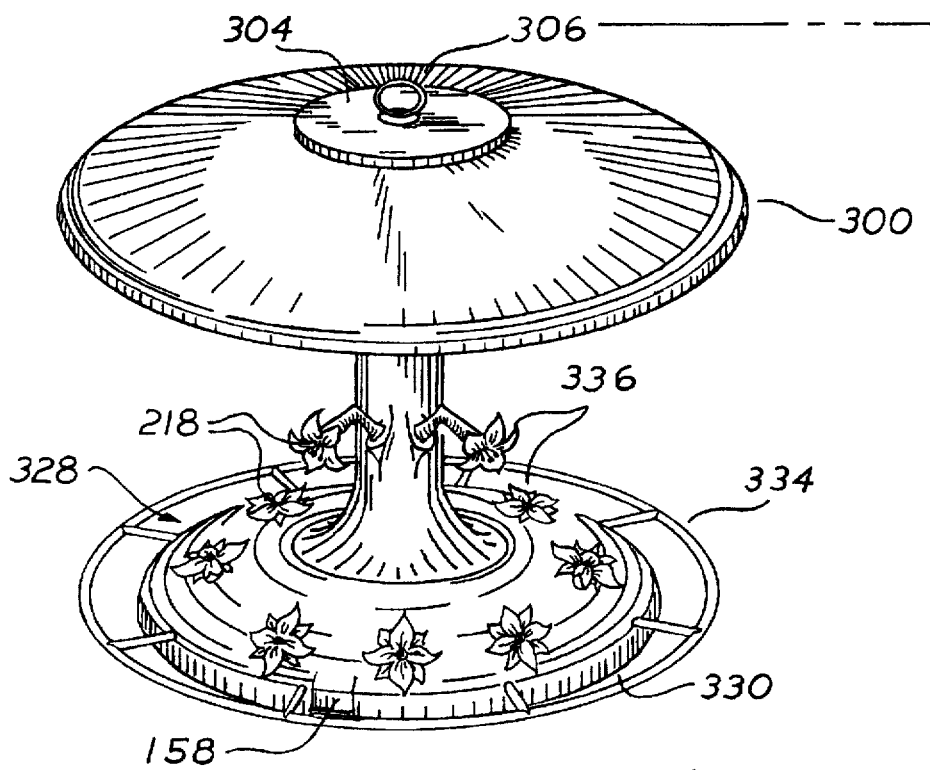
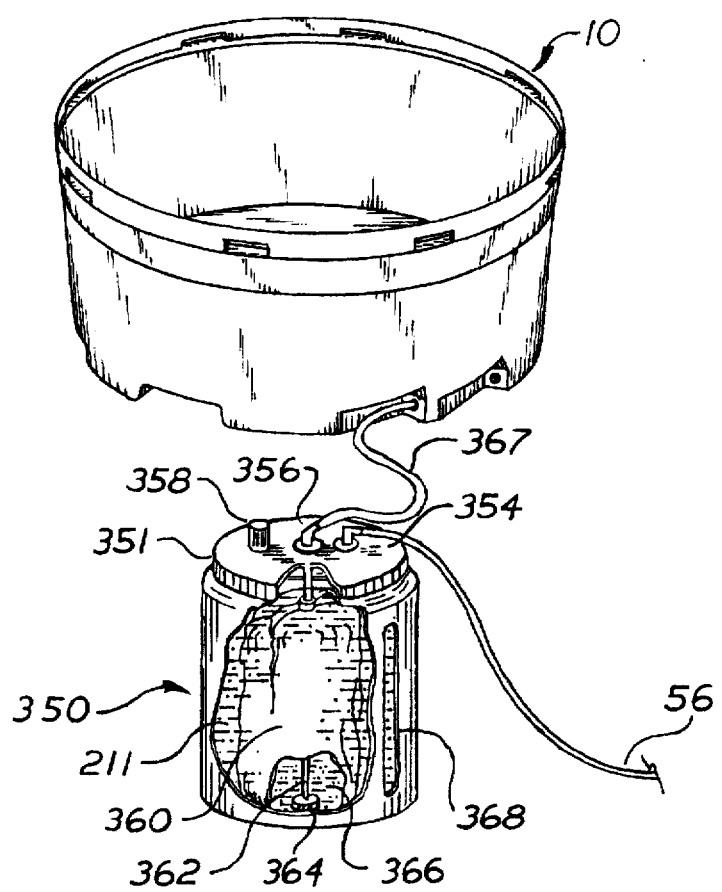
FIG. 35

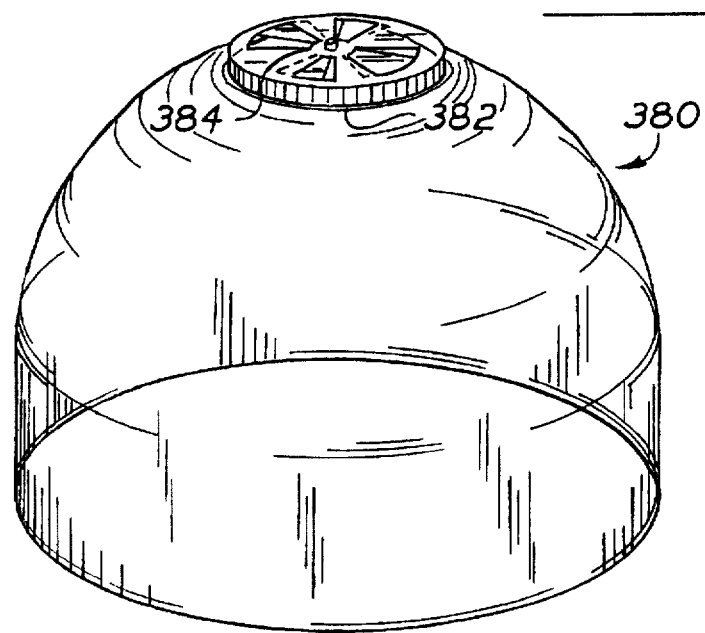
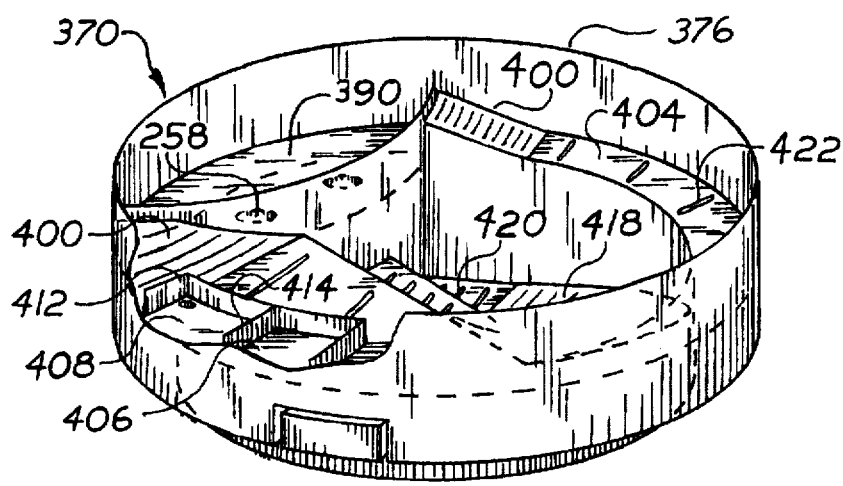
FIG. 39
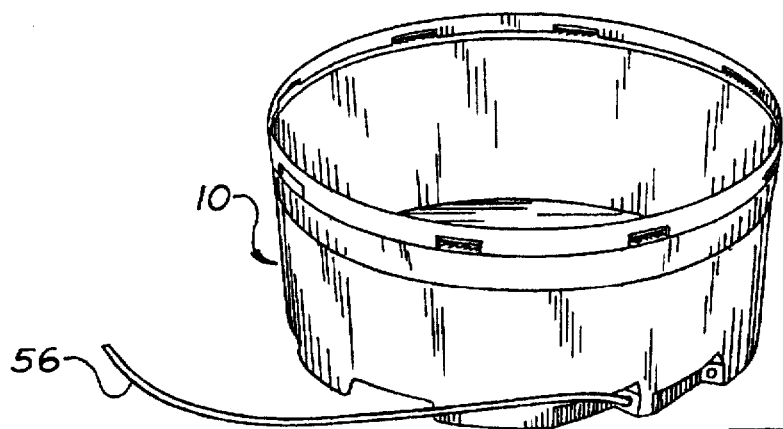

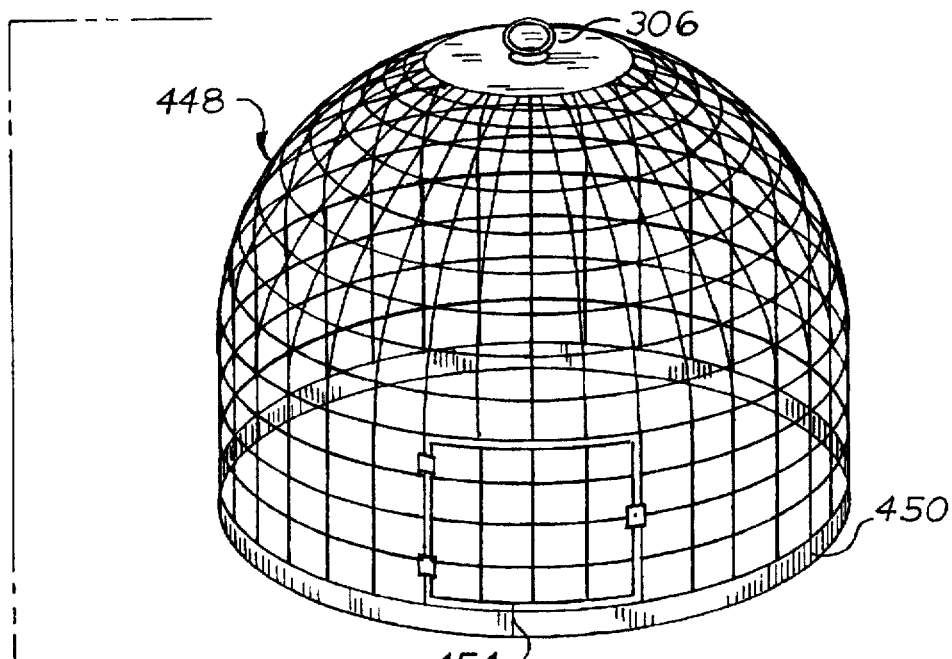
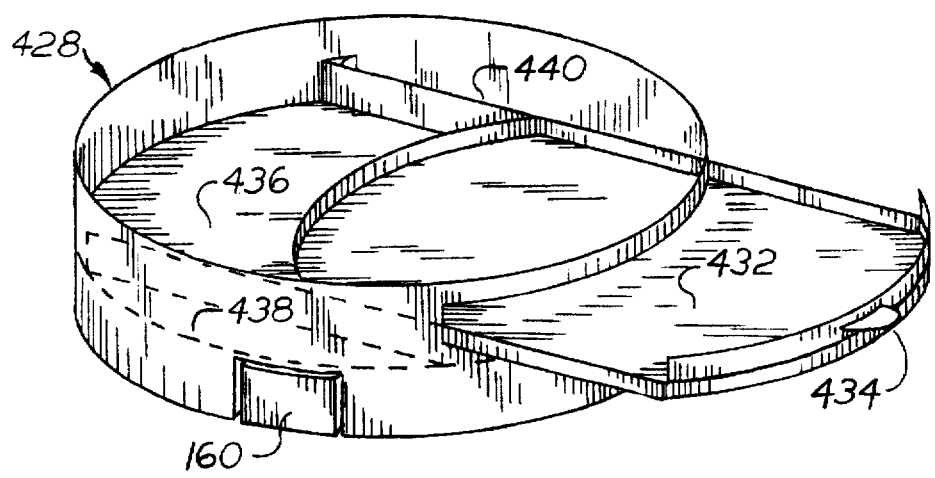
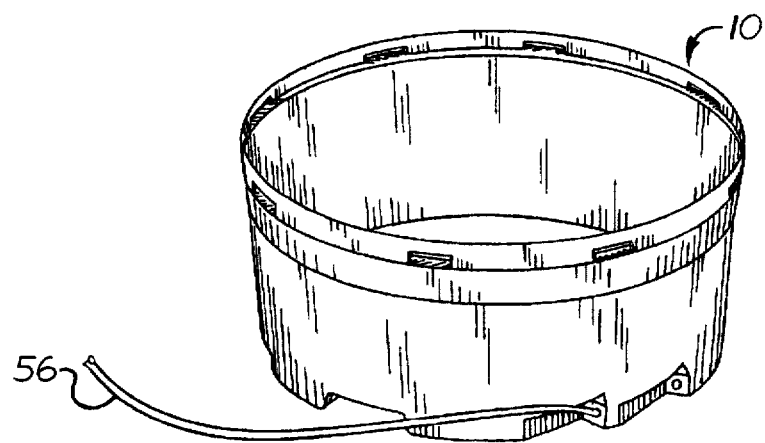
FIG. 42

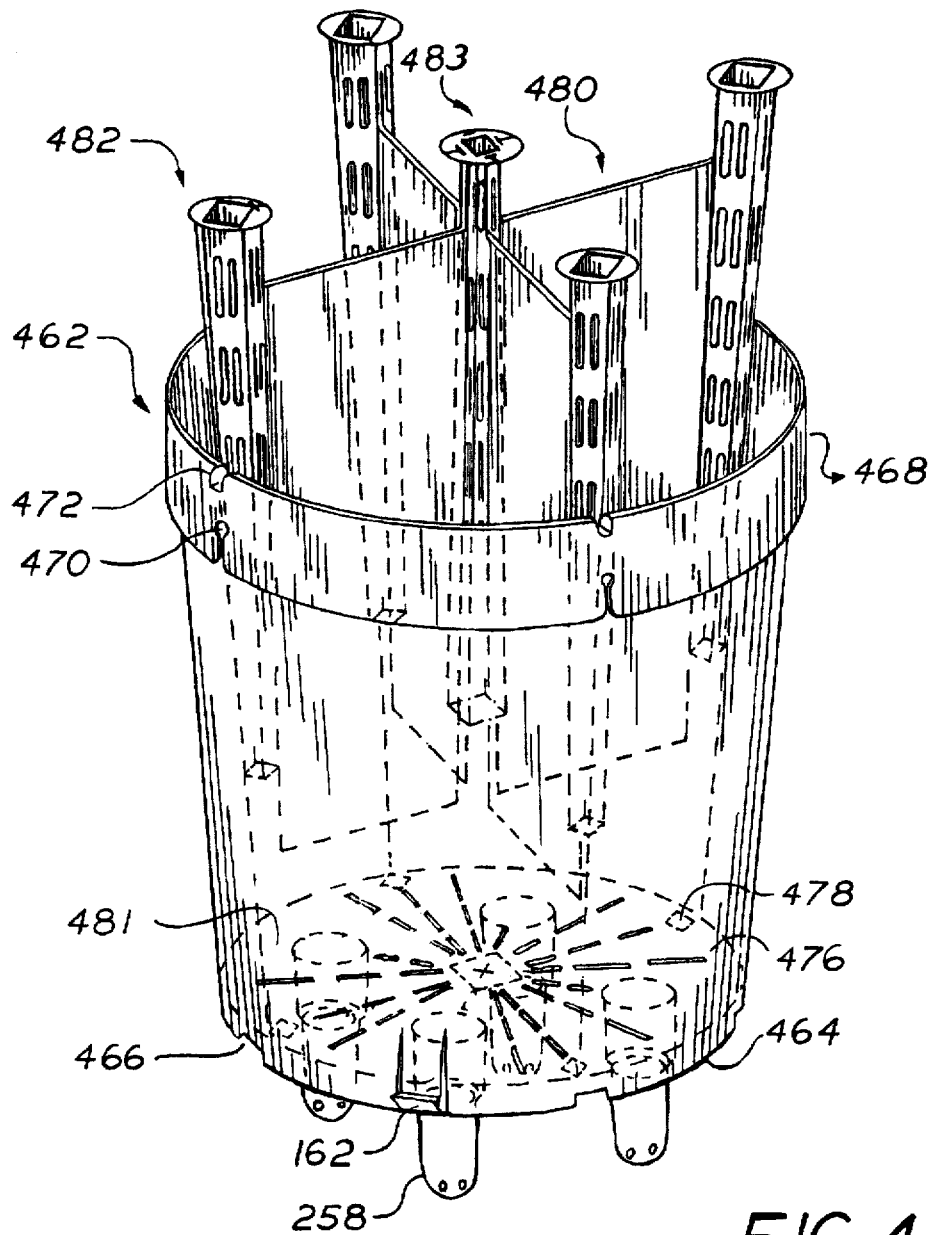
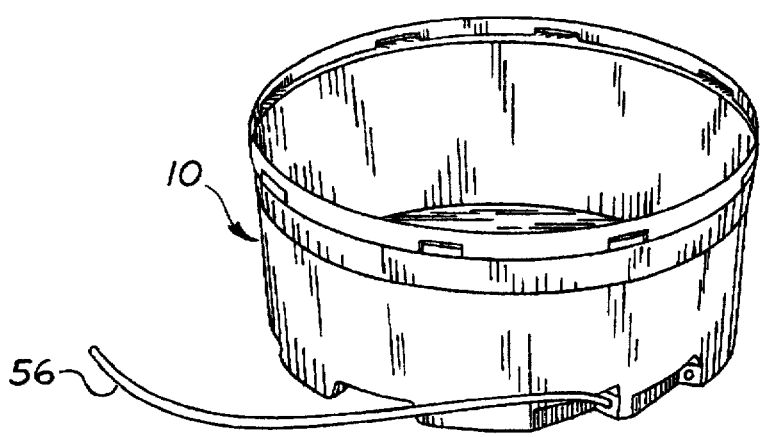
FIG. 44

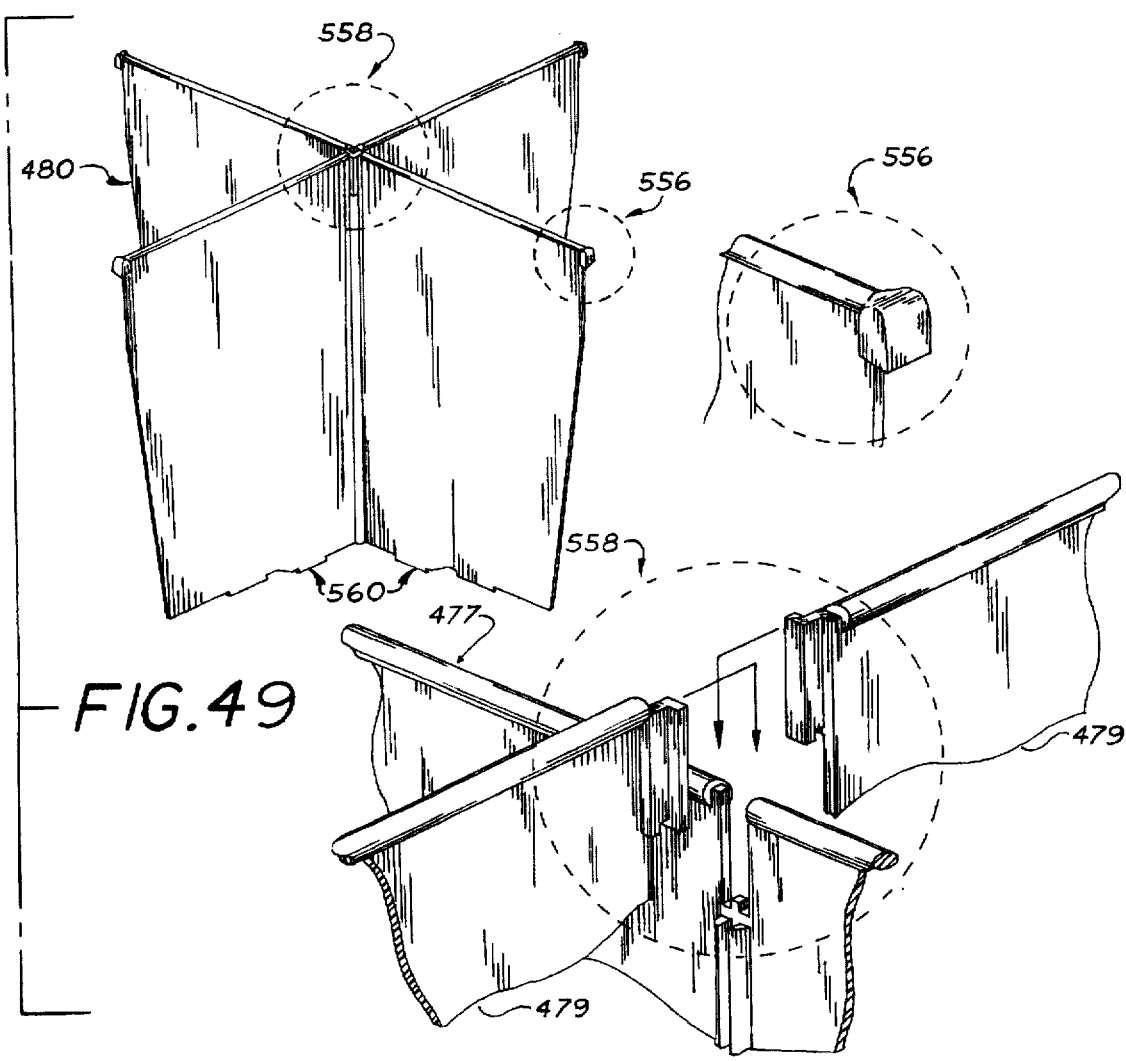
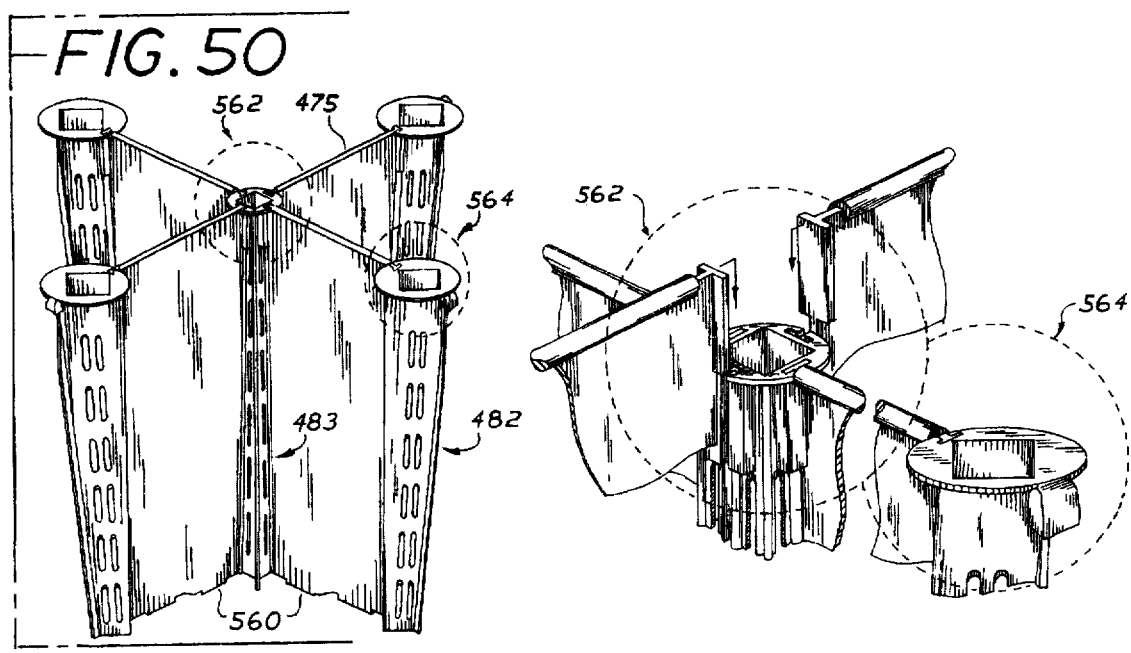

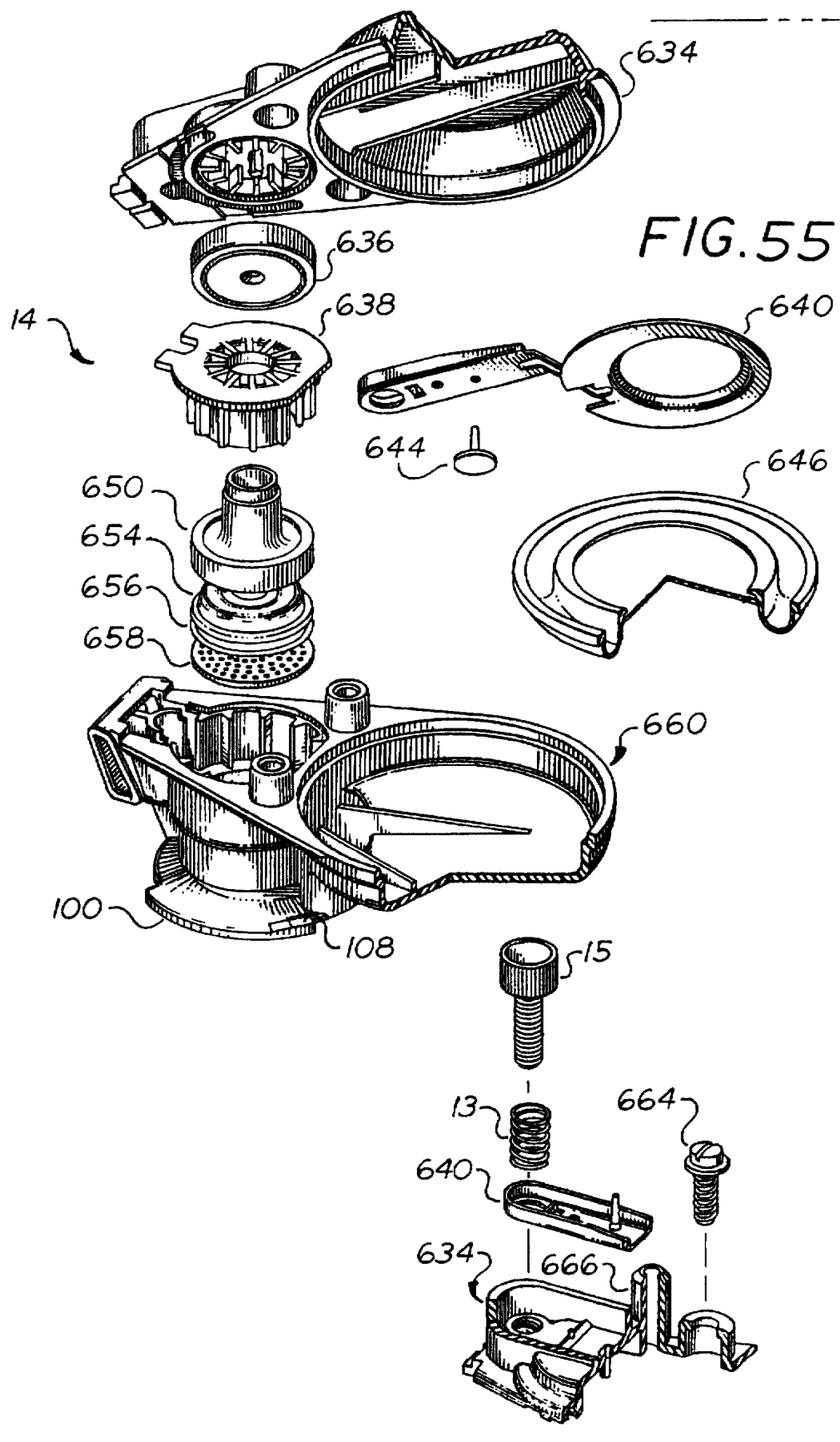

5,782,035

MULTI-PURPOSE AUTOMATIC FILLING AND LEVELING FLUID BASIN WITH WATER TRANSFER

RELATED APPLICATIONS

This application Ser. No. 08/488,292 is related to U.S. patent application titled Multi-Purpose Automatic Filling and Leveling fluid Basin and U.S. patent application Ser. No. 08/479,712 titled Fill Valve filed in the names of the same inventors as this application on even date.

FIELD OF THE INVENTION

The present invention relates to a multi-purpose automatic filling and leveling fluid basin with water transfer and more particularly to such a basin which cooperates with a source of pressurized liquid such as water.

BACKGROUND ART

In its preferred embodiment, the present invention incorporates a number of improvements to a fluid diaphragm valve used for toilets, described in U.S. Pat. No. 4,240,606 and incorporated herein by reference.

A reliably repeatable self-leveling fluid valve that is also compact, inexpensive to manufacture and impervious to typical environmental forces, is needed in the so-called 'self watering' or 'automatic' growing containers for plants. The following eighteen patents allegedly describe some form of 'self watering' or 'automatic' growing container for plants:

| | | |
|---|---|---|
| 3,733,746 Allen Jr. | May 22, 1973 | Self Feeding Flower Pot |
| 3,758,987 Crane Jr. | Sep. 18, 1973 | Automatic Plant Watering Device |
| 3,775,904 Peters | Dec. 4, 1973 | Self-Watering Flower Pot |
| 3,783,555 Peters | Jan. 8, 1974 | Self-Watering Flower Pot |
| 3,871,131 Berglund | Mar. 18, 1975 | Self-Watering Plant Pots or Receptacles |
| 3,903,644 Swift | Sep. 9, 1975 | Self-Watering Planter and Method of Making |
| 4,052,818 Hagerty | Oct. 11, 1977 | Method and Apparatus for Containerizing Plants with a Self-Watering System |
| 4,148,155 Allen | Apr. 10, 1979 | System and Apparatus for Automatically Feeding |
| 4,183,175 Magee | Jan. 15, 1980 | Self-Watering Apparatus for Growing Plants |
| 4,198,784 Sukes | Apr. 22, 1980 | Vessel for Supporting and Automatically Providing Liquid to Vegetation |
| 4,324,070 Swister | Apr. 13, 1982 | Self-Watering Planter |
| 4,329,815 Secrest | May 18, 1982 | Self Controlled Watering Planter Device |
| 4,344,251 Edlung | Aug. 17, 1982 | Self-Irrigating Pot for Plants |
| 4,356,665 de Oliveos | Nov. 2, 1982 | Self-Watering Planter |
| 4,527,354 Sellen | Jul. 9, 1985 | Implantable Reservoir for Automatic Watering |
| 4,937,972 Freitus | Jul. 3, 1990 | Self-Contained Plant Growth System |
| 5,020,261 Lishman | Jun. 4, 1991 | Moisture Sensitive Self-Watering Planter |
| 5,341,596 Kao | Aug. 30, 1994 | Automatic Water Supply Device for Potted Plants |

In fact, these containers are neither self-watering nor automatic because they require human refilling of the reservoir.

Three issued patents that are also true automatic plant pots are:

| | | |
|---|---|---|
| 4,083,147 Garack | Apr. 11, 1978 | Automated Planter Box System |
| 4,546,571 Scrivens | Oct. 15, 1985 | Plant Watering Apparatus |
| 4,557,071 Fah | Dec. 10, 1985 | Automatic Watering and Feeding System for Plants |

There is a need for a self-filling and self-leveling fluid basin which can perform a number of functions and cooperates with various other structures, including, but not limited to a plant pot converter, an animal water feeder, an underground spring, a bird bath, a humming bird feeder, an amphibian habitat, an animal/bird cage, a plant pot and a water toy.

SUMMARY OF THE INVENTION

The present invention relates to a device for dispensing liquid to a liquid using apparatus. The device comprises a basin having a closed bottom, at least one side wall and an open top. A valve is associated with the basin, the valve having an inlet and an outlet. A liquid level sensor causes the valve to operate to maintain a user-selected liquid level in the basin. A connector connects the valve inlet to a source of liquid under pressure and a coupling on the basin connects the liquid using attachment to the open top of the basin. A liquid transfer means extends between the basin and the liquid-using apparatus for transferring liquid from the basin to the liquid using apparatus at a rate less than the rate required to fill the basin from the source of liquid.

The attachment may have a number of different configurations such as a plant pot converter, an animal liquid feeder, a simulated underground spring, a bird bath, a humming bird feed, an amphibian habitat or an animal bird cage.

BRIEF DESCRIPTION OF THE DRAWINGS

FIG. 8 is two oblique views and sectional views of attachment latch mechanisms.

FIG. 16 is side views of the various models of the preferred embodiment of the quick wick which is an accessory for the pot converter attachment as shown in FIG. 13.

FIG. 17 is side sectional sketches of the quick wick immediately after insertion and after expansion within the pot converter attachment as shown in FIG. 13.

FIG. 18 shows the quick wick assembly process.

FIG. 35 is an oblique exploded view of the hummingbird feeder shown in FIG. 34.

FIG. 39 is an oblique exploded view of the amphibian habitat shown in FIG. 37.

FIG. 42 is an oblique exploded view of the animal/bird cage attachment shown in FIG. 40.

FIG. 44 is an oblique exploded view of the gardener attachment shown in FIG. 43 with optional dividers and areating root pruners.

FIG. 49 is an oblique top view and enlarged oblique detail views of the divider accessories for the gardener attachment shown in FIG. 43.

FIG. 50 is an oblique top view and enlarged oblique detail views of the divider/areating root pruners combination accessories for the gardener attachment shown in FIG. 43.

FIG. 55 is an oblique exploded view of the valve 14 and its adjusting screw that fits in the basin 10.

DESCRIPTION OF THE PREFERRED EMBODIMENT OF THE INVENTION

Figures 1, 2:
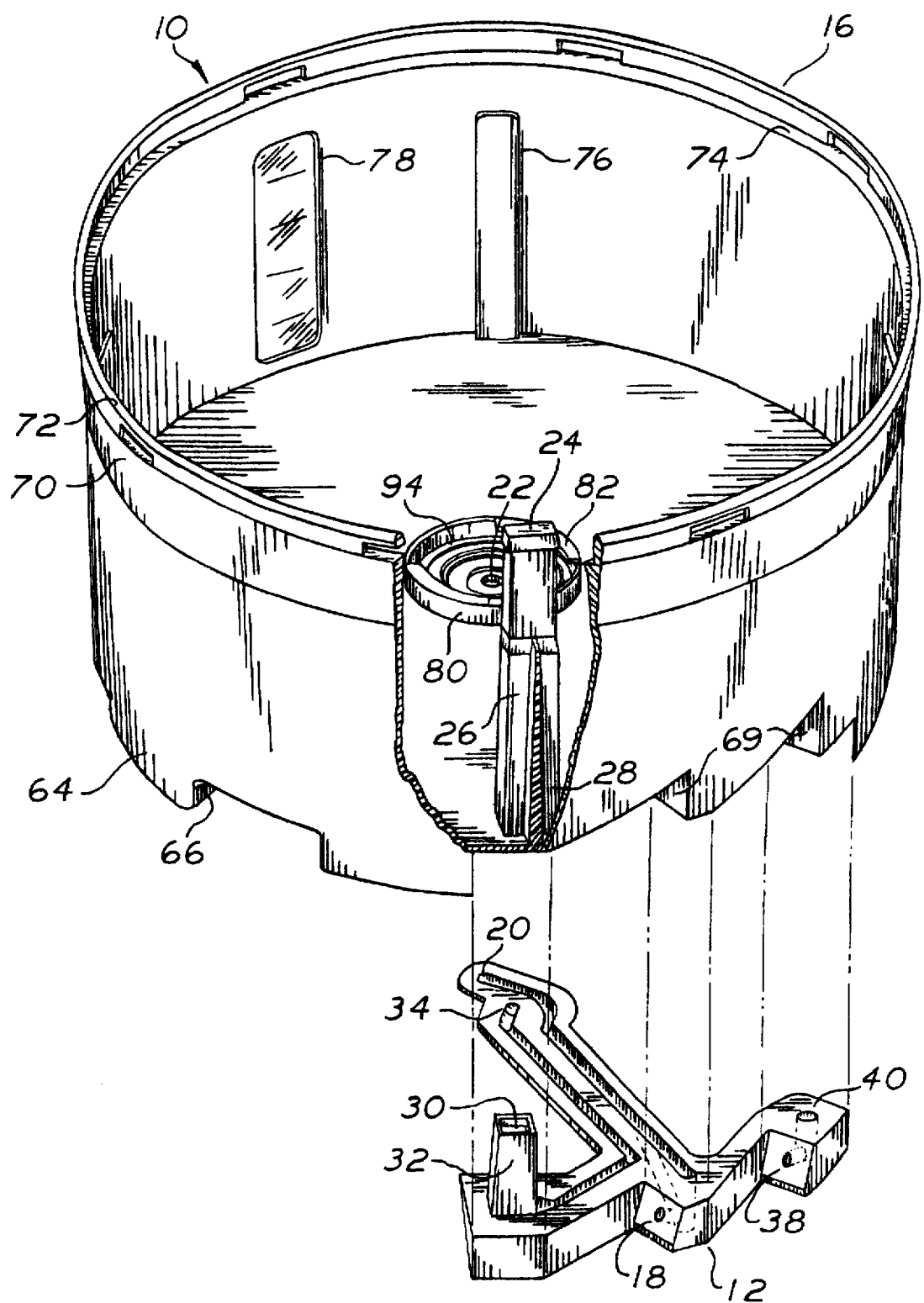
FIG. 1 is an oblique top view of the basin body prior to fusing of the utility bracket.
FIG. 2 is an oblique top view of the utility bracket before fusing to the basin body shown in FIG. 1.

Multi-purpose Automatic Filling and Leveling Fluid Basin

The Multi-purpose Automatic Filling and Leveling Fluid Basin is a fluid holding vessel called the basin 10 which can be of any size or shape and will in most cases be produced by injection molding using plastics. The basin accepts within it a readily detachable adjustable fill valve 14 that is connected to a pressurized water or other fluid supply 58. The valve fills and maintains the level of fluid in the vessel which can be selected and adjusted by the user.

The basin 10 is composed of two primary components ultrasonically welded together to form a water and air tight one piece unit. These components are called the basin body 16 and the air/fluid utility bracket or utility bracket 12. In addition to these fused parts are; the twist-in compression cam 108 equipped automatic filling and leveling diaphragm valve 14; a silicone air isolating gasket 96 and a matching fluid isolating gasket 98 that seal the areas between the valve 14 and the basin body 16, a small plastic snorkle cap 24, the insert x thread fittings 46 that fit the external fluid line port 18 and external drain line port 38, and the optional punch-in basin drain screen 120.

The utility bracket 12, when fused to the basin body 16, performs tree functions:

Fluid (preferably filtered) is delivered from any pressurized source trough a standard ⅛th inch (inside diameter) fluid delivery line 56 (commonly referred to as drip irrigation line) connected to an optional existing quick disconnect fittings 50 and 54 and then connected directly or with additional fluid delivery line to the insert x thread barbed fitting 46 that threads into the utility bracket 12 in its external fluid line port 18. Attachment of the fluid delivery line 56 is facilitated by the space for thumb and fingers created by the utility access cutouts 69 just above the said barbed fitting. The optional spring clamp 48 can be used to secure the fluid delivery line 56 to the insert x thread fitting 46. The fluid flows through the fluid supply channel 20 and through the internal fluid port 22 on the bottom of the basin 10 and into the valve 14.

Ambient air for operation of the diaphragm valve 14 flows under the snorkle cap 24 down through the basin snorkle body 26 which is supported by the basin snorkle support rib 28, past the utility snorkle debris trap 30, around the utility snorkle 32, down into the utility air channel 34, then through the air channel then up through the bottom of the basin 10, through the internal air port 36, into the air trough 92, into the valve base air port 106 and into the underside of the diaphragm in the valve 14. The snorkle cap 24 keeps debris from the attachments or other sources from entering the basin snorkle body 26 and also acts as a 'diving bell' flood protection device. Should the basin 10 be in an environment where external water elevates past the bottom edge of the basin vent/latch ports 70 and over the snorkle cap 24 the snorkle cap prevents entry of water into the interior of the snorkle assembly as a result of its lower edge being below the upper edge of the basin snorkle body 26. The basin 10, with or without attachments can endure a true flood (if attached to a surface using the basin hold-down tabs 68 or otherwise held in place) and when no longer flooded will return to normal operation without failure including during the flood itself when the valve 14 shuts itself off. The snorkle cap 26 is ribbed on its interior surfaces to create secure multiple open vent grooves when pushed onto the basin snorkle body 26. Locating the snorkle assembly inside the basin 10 prevents accidental damage and prevents fouling by mud, soil, water, insects, and other debris that could occur if ported anywhere external to the basin 10.

Fluid is drained from the basin 10 by removing the tear out drain line tab 44 in the interior bottom edge of the basin and inserting the optional basin drain screen 120 into the internal basin drain line port 42 opened by said removed tear out tab end exposing the internal utility drain line port 40 that accepts the drain screen. By connecting an ⅛th inch drain discharge line 60 to a insert x thread fitting 46 threaded into the external drain line port 38 the user may drain the basin and can attach a standard drain regulating valve 62 to control drain flow rates based on the attachment used and the requirements or desires of the user.

The utility bracket 12 is a uniform thickness throughout its entirety with two exceptions; the utility snorkle 32 walls can be thinner as they are protected by the basin snorkle body 26 and the areas immediately above the external fluid line port 18 and the external drain line port 38 which are small, thick pockets of material created as a result of injection mold release requirements. When ultrasonically fused the basin body 16 and the utility bracket 12 fit together and create completely isolated seals around each of the three functional areas listed above.

After ultrasonic welding, the utility bracket 12 also finishes the basin feet 64 and completes the 'footprint' of the basin 10 as well as strengthening the basin bottom in the area where the basin ribs 66 are absent. For ease of storage and shipping the basin 10 stacks and nests at approximately ⅗ths of its own height by sitting on the basin stacking supports 76 all four of which surround the interior of the basin at approximately 90 degree increments. The top of the basin snorkle body 26 nests inside the hollow interior of the utility snorkle 32 above it. The scalloped bottom edge of the basin 10 is aligned so as to nest over and next to the basin stacking supports 76 with their mutual corner radii and thereby 'lock' the basin into place which prevents shifting and protects the basin snorkle body 26 and related assembly during storage, shipping and handling.

After installing the fluid isolating gasket 96 in the fluid gasket trough 88, and the air isolating gasket 98 in the air gasket trough 90, the valve 14 twists into the valve mounting flange 80 by slipping down past the retention tabs 82, (2 each opposing) and twisting 90 degrees until the retention tab compression cams 84 (2 each opposing) and the valve base 100 and the valve base compression cams 108 (2 each opposing) engage forcing the valve downward until the retention tab stops 86 (2 each opposing) stop the valve. The twisting downward motion during valve 14 insertion, compresses the larger diameter air isolating gasket 98 and the smaller diameter liquid isolating gasket 96 downward and outward into the four gasket retention rings 94 that border both sides of both said gaskets and between which is created the air trough 92 which is an isolated encircling trough allowing ambient air portage even in the event of incomplete insertion or incorrect positioning of the valve. Valve base seating beads 101 are molded in relief on the underside of the valve base 100 surrounding the valve base fluid port 104 and enclosing within the outer circumferal bead the valve base air port 106. The said seating beads further compress the center of the surrounding said gaskets enhancing the sealing function and preventing the escape of pressurized water or leakage in the the ambient air system. Due to the central axis location of the internal fluid port 22 and the opposing valve base fluid port 104 the delivery of fluid is un-affected by valve 14 position. The valve 14 will operate when installed in either of the two possible insertion positions, however four of the attachments for the basin 10 require the valve be in its preferred position which is facing the utility or 'back' wall of the basin and fully stopped by the retention tab stops 86. This allows the said four attachments to utilize all of the available space in the basin 10 by having the attachment 'hug' the basins interior walls and floor and wrap around the valve 14 and the basin snorkle body 26 assembly.

To function automatically, the basin 10 (with valve 14 installed) must be connected to a pressurized fluid line between 5 psi and 80 psi and with fluid near or at the consistency of water and of a non-corrosive character. The user may adjust the level of the fluid in the basin 10 by use of the valve adjusting screw 15 located on the top of the valve 14. Minimum fluid level is at the top edge of the adjusting screw 15. The maximum fluid level is established by the user and the attachments connected to the basin 10, but is always below the basin vent/latch ports 70 of the basin 10. The user may monitor the fluid level in the basin 10 by using the fluid level sight glass 78 on the 'front' wall of the basin. The basin 10 and all of its attachments operate at the minimum fluid level, thus allowing the user (or environmental forces) to tilt the basin ten degrees or less without spilling fluid. The valve 14 and its fluid level control performance is unaffected by said tilt or tilting.

To function manually, the basin 14 requires the manual operation insertion plug 110 be twisted by hand (after installation of the fluid and air isolating gaskets 96 and 98) using the manual operation insertion plug finger key 112 molded on the top of said plug. The manual operation insertion plug 110 is identical in shape to the valve base 100 and like the valve base has opposing manual operation insertion plug cams 114. When installed into the valve mounting flange 80 the said insertion plug seals the internal fluid port 22 and the internal air port 36 and turns the basin 10 into a reservoir that must be filled by the user using the detachable optional basin funnel 147 that slips through any of the available basin vent/latch ports 70.

To function in series, a 'controlling' basin 10 with valve 14 installed is connected to a series of additional 'passive' basins that have multiple basin insertion plugs 116 installed in their valve mounting flanges 80 and are all on the same level surface as the controlling basin. The controlling basin 10 is connected to a constant fluid supply 58 and must have the basin drain screen 120 installed and the drain discharge line 60 connected to the insert x thread fitting 46 threaded into the external drain line port 38 and connected to the external fluid line port 18 of the first 'passive' basin of the series. Fluid, controlled by the controlling Basin 10, ports water through the center of the multiple basin insertion plug fluid port 118 in the 'passive' basin. That passive basin in turn may have the drain discharge line 60 activated and connected in turn to additional 'passive' basins in series.

Attachments for the basin 10 all sit on the attachment seating rim 74. Some of the attachments are able to rotate on the basin 10 360 degrees (pot converter, underground spring, gardener and water toy) except when their respective latches FIG. 8 are in place through the basin vent/latch ports 70 located at equal increments around the basin immediately above the basin seating rim 74. Attachments that are destined to be hung must be snapped into place with the irrespective latches FIG. 8 to secure the attachment to the basin thus preventing rotation except for the increments mentioned previously. The remaining attachments sit on the basin 10 in only one position and snap into and out of place with a simple push or pull (depending on attachment style) of one finger on one or both of the latches of the Attachment. (All basin attachments can be removed with the use of only one arm if necessary.) To facilitate comfortable handling, the bottom edge of the basin 10 is rounded as are the basin rim 72 and all the basins external and internal edges except the deliberate right angle on the interior and exterior edges of the attachment seating rim 74.

The basin 10 can be made in any imaginable shape or size. Some examples would be a square basin 122, a rectangular basin 124, a doughnut shaped basin 126, a semi-circle basin 128 and a corner basin 130.

Additional accessories for the basin 10 include, but are not limited to;

An optional heater 132 consists of a conductive element and thermocouple encased in a waterproof heat resistant injection molded shell formed to fit the basin 10 that is integrally molded to the waterproof heater male electrical terminal 134 that snaps into and passes through the basin vent/latch ports 70 on the upper rim of the basin and is connected by the heater plug and cord 136 to the controller, thermostat and power supply appropriate to the requirements of the basin and attachment size, style and function.

An optional centrifugal submersible fluid pump 138 can power accessories for all the basin 10 attachments except the underground spring 254 which has no application that might require a pump. The pump 138 snaps into the pump mounting tabs 146 in the bottom of the basin next to the basin snorkle 26 assembly. A hose connected to the pump water outlet 140 can deliver pressurized water to any of the accessories that utilize it. The fluid pump 138 is connected to its power source with a waterproof fluid pump male electrical terminal 142 that snaps into and through the basin vent/latch ports 70 on the upper rim of the basin and is connected by the pump plug and cord 144 to the controller and power supply appropriate to the requirements of the basin and attachment size, style and function.

The basin vent/latch ports 70 allow ambient air to enter the basin 10 when attachments are in place except when the user rotates those attachments (that can do so) and diminishes or cuts entirely the flow of ambient air into the basin. The basin 10 accepts the attachments using a number of different latches that all fit the basin vent/latch ports 70. Said latches include but are not limited to: the pot converter latch 150, the animal waterer latch 152, the underground spring latch 154, the bird bath latch 156, the hummingbird feeder latch 158, the amphibian habitat and animal cage latch 160, the gardener latch 162 and the water toy latch 164.

The Valve

The valve of the present invention shown in FIG. 55 is a modification of a valve originally conceived of and designed for use in toilets by Dwight N. Johnson of California. (Latest U.S. Pat. No. 4,240,606, Dec. 23, 1980) incorporated herein by reference. This valve is currently being manufactured under the name FILLpro Toilet Tank Fill Valve and according to the manufacturer (Delta/Peerless Faucet Corp.) over nine million of the valves have been distributed worldwide since its inception. The mode of attachment of the valve of FIG. 55 must be completely redesigned and the adjusting screw and spring must be shortened to fit and operate with the present invention. No modifications to the valve body itself as disclosed in U.S. Pat. No. 4,240,606 nor to its mechanism have been made, so the functionality of the valve is unaffected.

Specially modified versions of the FILLpro valves have been operating continuously in test units that mimic the present invention in all of its embodiments. The tests have shown that both the anti-siphon and the standard models of the FILLpro valve are capable of reliable, long term, regulated flow rates as low as one drop per minute. Its inherent nature as a toilet valve, (requiring appropriate flow rates) means the valve is also able to respond quickly when needed with outstanding flow performance, plus the valve is extremely quiet. The valve functions effectively at any angle up to 30 degrees on any axis and is able to maintain a water level less than 12 millimeters above its own body (or fill a vessel many feet over its own body) and to do so repeatedly (for years) with excellent accuracy.

The test valves have been disassembled and re-assembled repeatedly with no change in performance and all of their parts are replaceable. They have been beaten, kicked, left in open vessels through months of storms and collected debris; covered with algae; buried in mulch, dirt and sand; been frozen dry out of the package and then been frozen with water inside the valve in empty vessels. It was only when the valve was frozen full of water in a vessel full of water that it ended up as a wounded valve, and that wound was only the adjusting screw female thread in the valve body being ripped out by the pressure, the rest of the valve was fine.

The patent of Dwight N. Johnson (numbered U.S. Pat. No. 4,240,606 and describing a Fill Valve) is incorporated into this disclosure with the following modifications:

Fluid is delivered to the valve by the means and method disclosed in this application in the Description of the Preferred Embodiment of the Invention; paragraph three.

Ambient air as required by the valve is provided by the means and method disclosed in this application in the Description of the Preferred Embodiment of the Invention; paragraph four.

Connection and operation of the valve and the means and method thereof are disclosed in the Description of the Preferred Embodiment of the Invention; paragraphs eight and nine.

Figure 3:
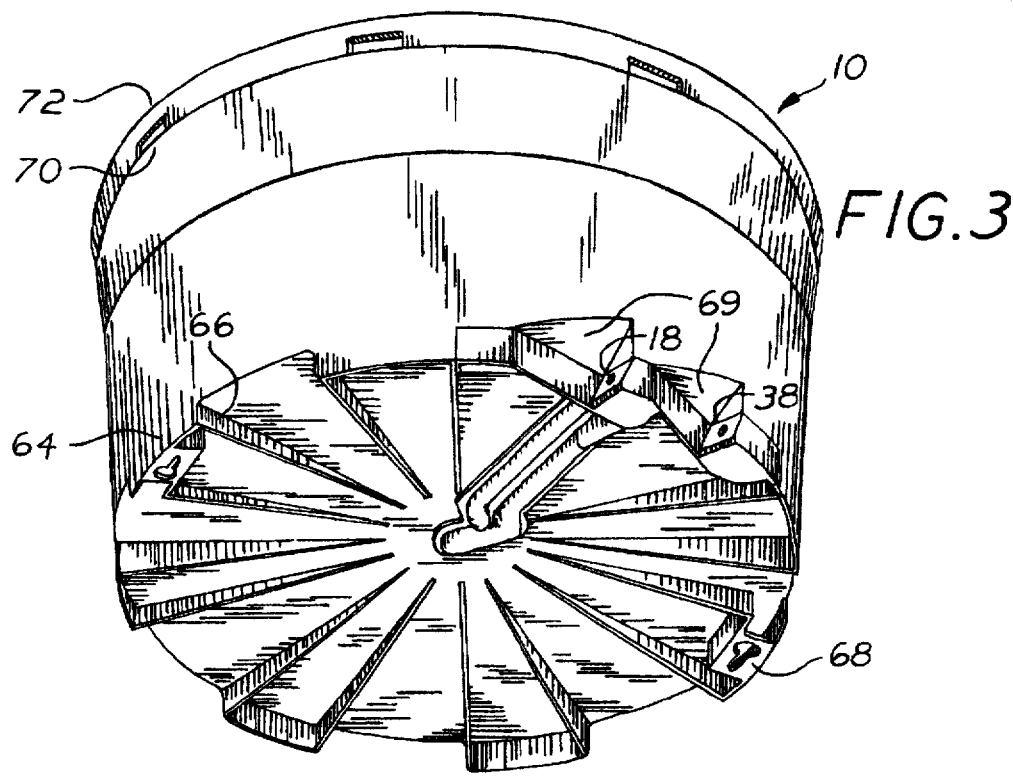
FIG. 3 is an oblique bottom view of the basin body and utility bracket fused together.

The physical changes to the valve from U.S. Pat. No. 4,240,606 are illustrated in FIGS. 4, 6, 7 and 55 of this specification and consist of two particular changes. First, the adjusting screw as disclosed by the Johnson patent and labeled in that patent as Reference Number 148, must have the un-threaded portion of its shank (Ref. #156 of Johnson) entirely removed, which shortens said screw to half its original height and allows the present invention to stack and nest with the valve installed and also increases the available area for the attachments to the present invention. The spring (Ref. #144 of Johnson) for the screw (Ref. #148 of Johnson) must be replaced with a smaller lighter spring appropriate to the requirements of the shallow fluid levels used by the present invention. Second, the valve attachment assembly and its related hard ware (best shown in the Johnson patent in FIG. 3) must be removed completely up to the line just above the Section Line 3, which is just below the base of the valve. Removing said portion of the valve leaves a flat base with a large hole in its center and two very small square holes side by side straddling the center line of the valve and projecting up and into the underside of the valve diaphragm assembly. This now flat, circular base 100 would have one if not two compression beads 107 molded into the base as well as the valve base compression cam 108 flanges, both shown in FIG. 7 with a side view shown in FIG. 6.

Figure 4:
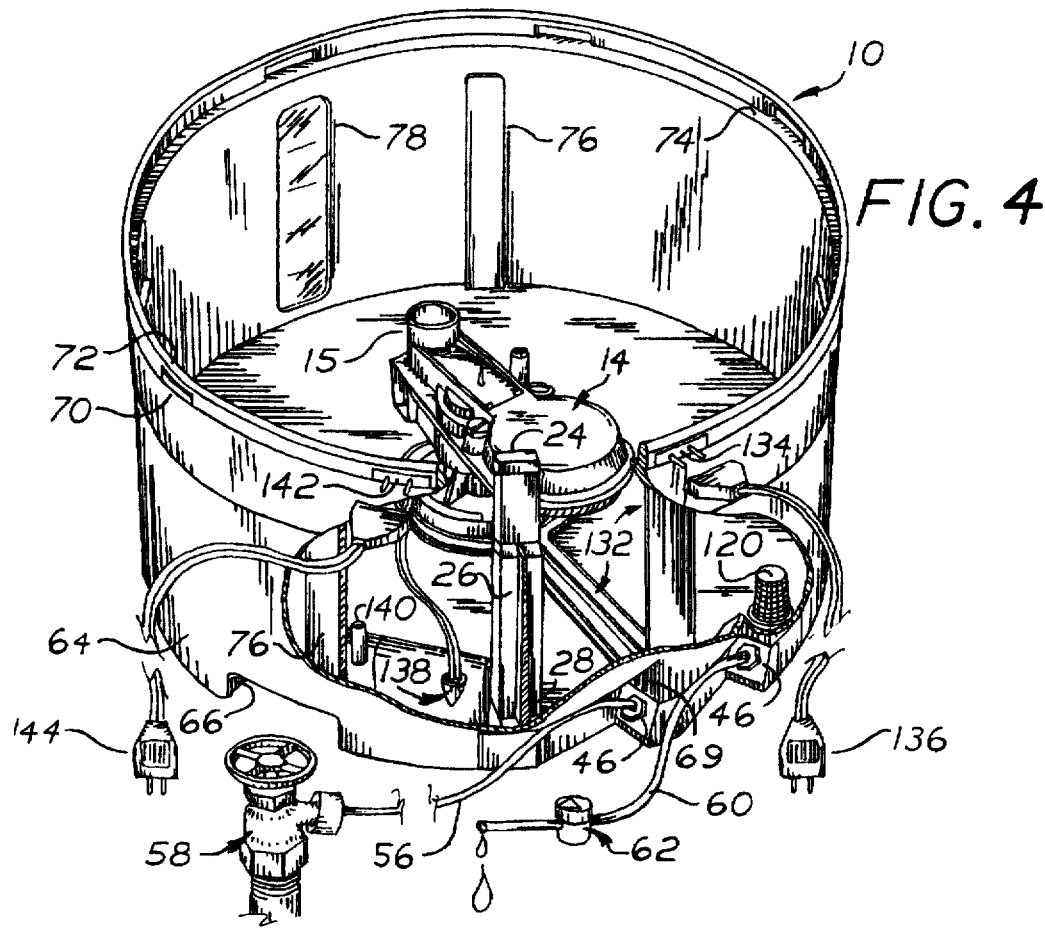
FIG. 4 is an oblique top view of the basin in its preferred embodiment with fittings.
Figure 5:
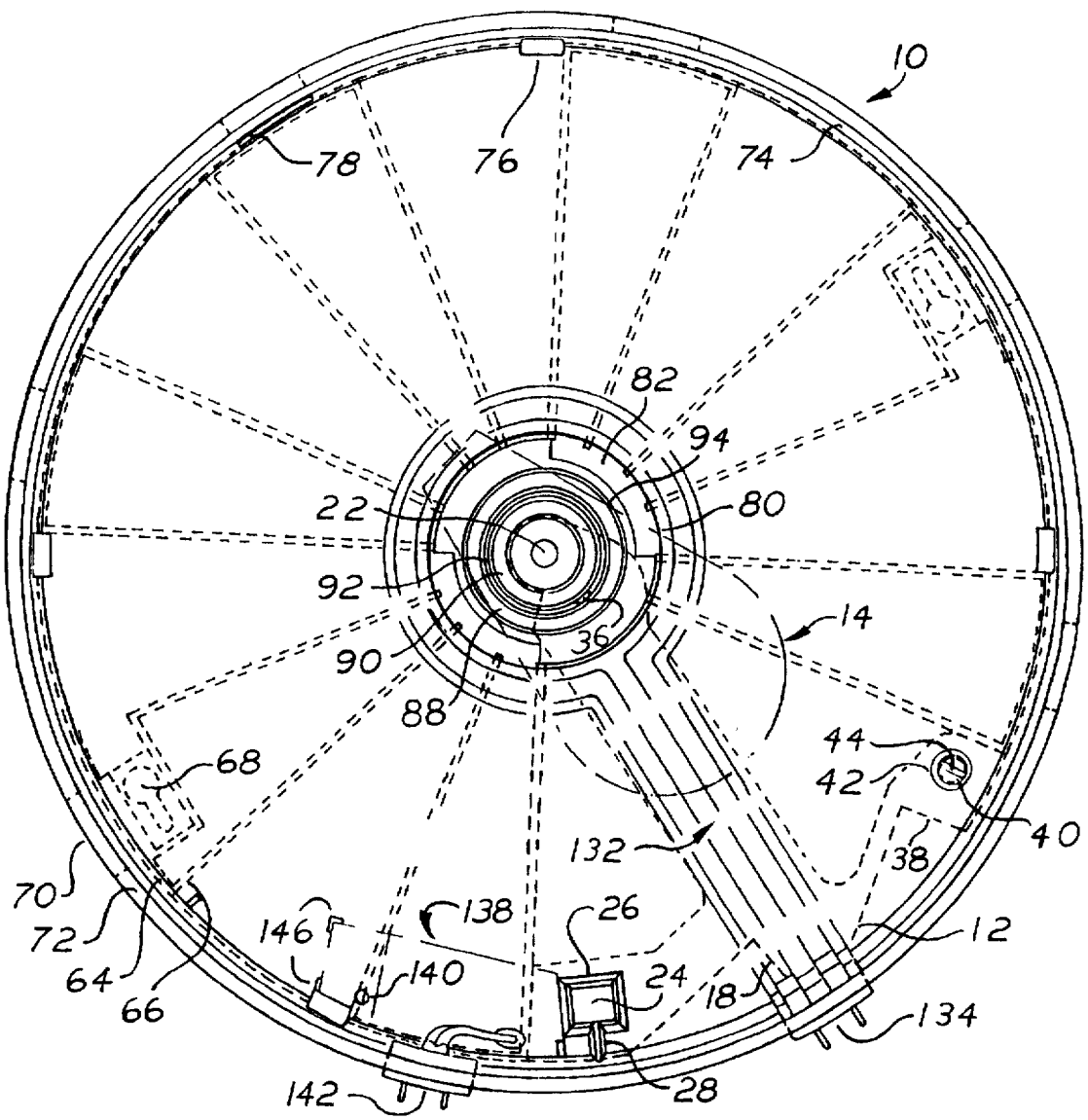
FIG. 5 is a plan view of the basin interior and structure with accessories as shown in FIG. 4.
Figure 6:
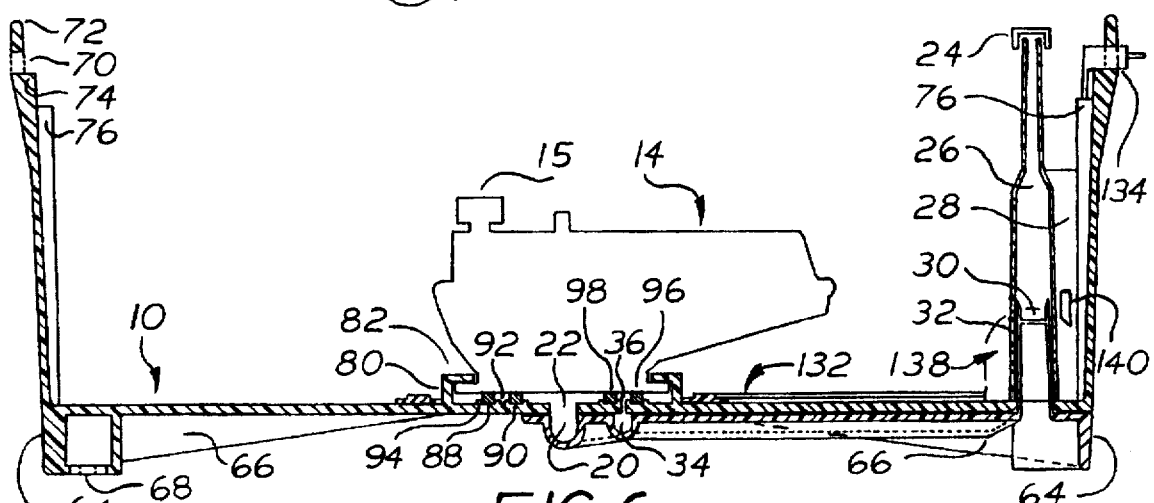
FIG. 6 is a combined sectional view of the basin components and valve as shown in FIG. 5. This is a false view with critical components shown along the same plane to demonstrate clearances for attachments.
Figure 7:
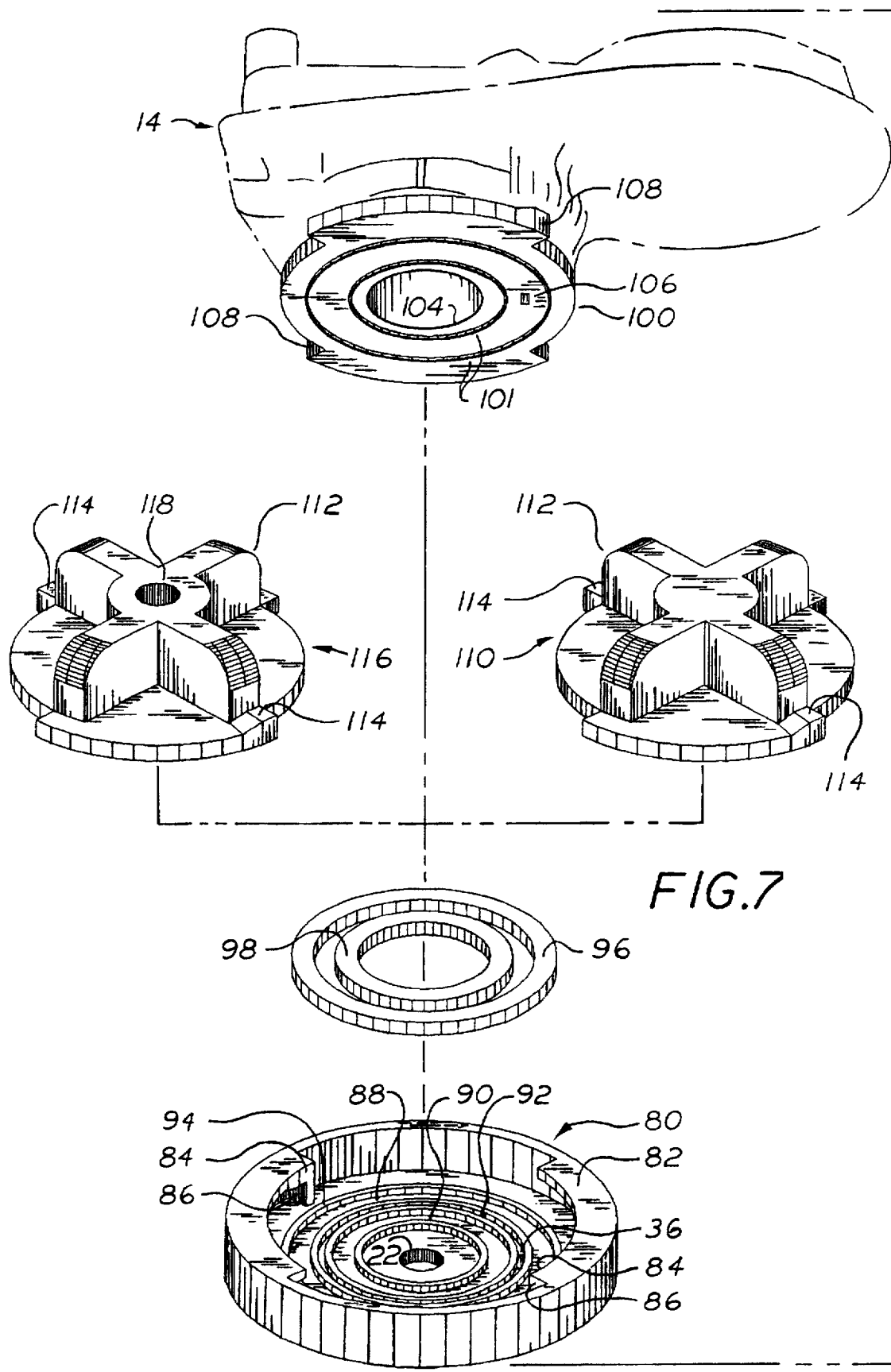
FIG. 7 is an exploded oblique view of the valve base, air and fluid gaskets, valve mounting flange, and basin insertion plugs as shown in FIGS. 5 & 6.
Figure 9:
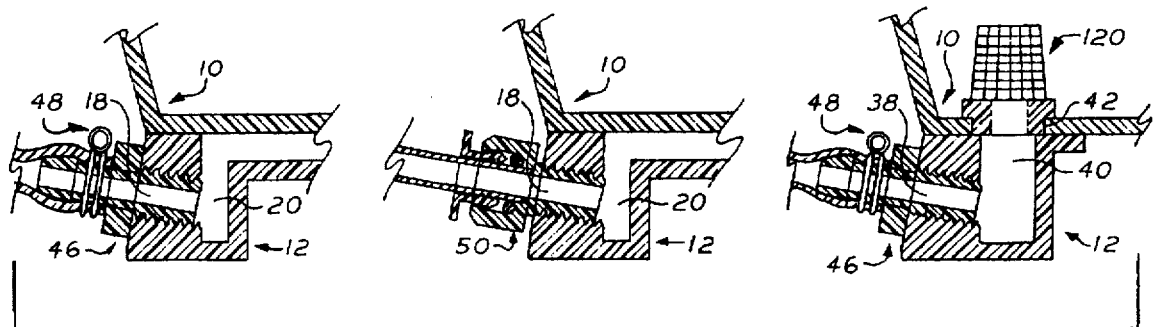
FIG. 9 is a section view of the inlet/outlet ports and fittings.
Figure 10:
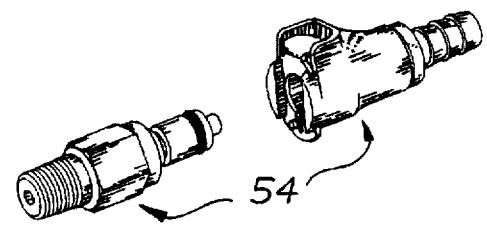
FIG. 10 is a group of sectional and oblique views of existing quick connect fittings compatible with the fittings shown in FIG. 9.
Figure 11:
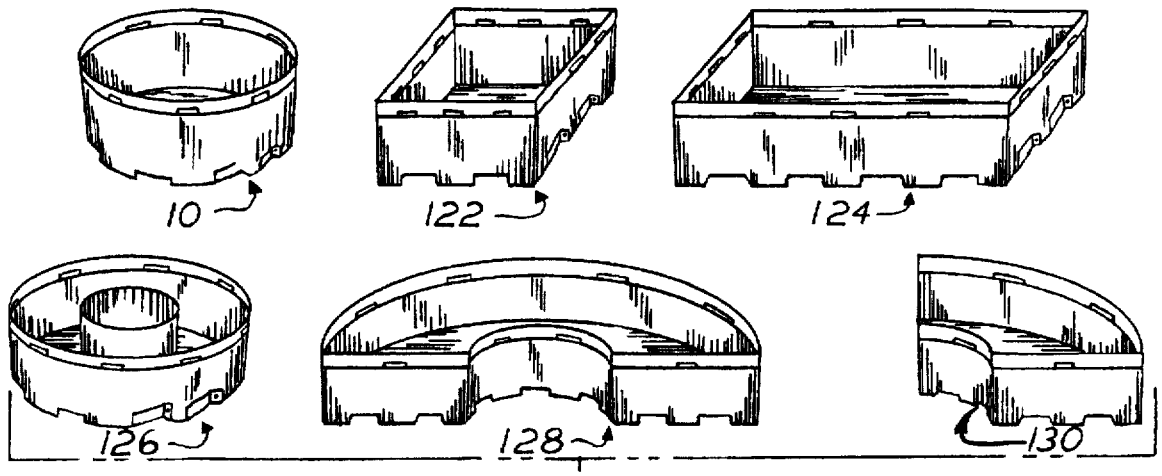
FIG. 11 is oblique sketches showing optional basin shapes.
Figure 12:
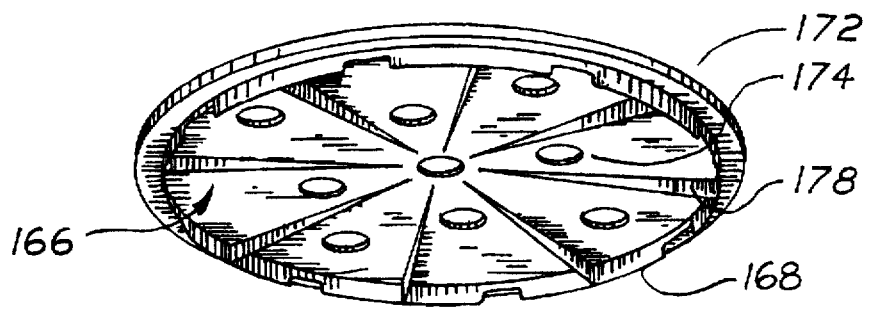
FIG. 12 is an oblique bottom view of the pot converter attachment shown in FIG. 13.
Figure 13:
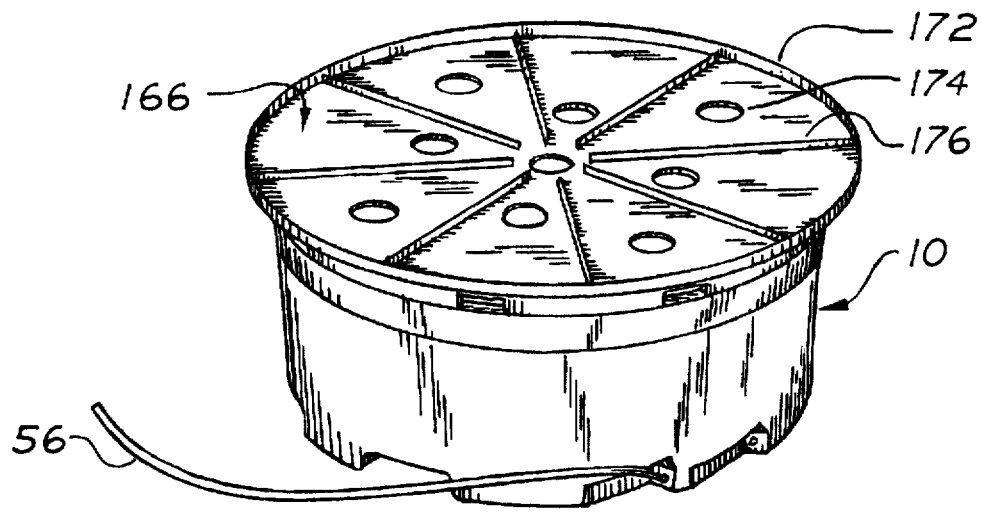
FIG. 13 is a oblique top view of the pot converter attached to the basin shown in FIG. 4.

Shown in FIG. 55 are the details of construction of diaphragm valve 14, also shown in FIGS. 4 and 7, which except for its dimensions and the modifications thereof described hereinabove is identical to the commercial version of the Johnson diaphragm valve disclosed in U.S. Pat. No. 4,240,606.

Valve 14 has a hollow bodied valve body 660 and a hollow bodied valve cover 634 which are joined together by fastening screws 664 to form two cavities, the first of which is conformed to receive and seat valve seal member 636 which divides the first cavity into an upper portion and a lower portion and which forms a liquid tight seal when valve 14 is in its closed position, and the second of which is conformed to receive and seat diaphragm 646 and which is open at its bottom and closed at its top and in liquid communication with the upper cavity of valve body 660. Valve 14 has a liquid inlet port 104, which receives liquid which passes through internal liquid port 22 in the bottom of basin 10 from the source thereof under pressure; a liquid outlet port 666, which discharges liquid from the lower portion of the valve cavity of valve 14 into the interior of the basin 10 when valve 14 is in its open position; a lever 640 which seats on the upper surface of diaphragm 646 transmits diaphragm movement to pilot valve member 644 and thereby opens and closes valve 14 when the liquid level in basin 10 drops below the predetermined level and reaches the predetermined level, respectively; a diffuser 638 positioned in the liquid flow path between an insert member 650 and valve seal member 636 which creates a large number of substantially right angled turns in the liquid flow path and causes a loss of energy in liquid flowing through valve 14; a backflow assembly 654, 656, 658 (of which insert member 650 forms the upper element thereof) on lever 640 prevents fluid backflow from basin 10 onto valve seal member 636 when valve 14 is in its closed position; and a backflow preventer 648, consisting of an upflow perforated disc member 658, an outer ring 656, an elastomeric body 654 and an insert member 650, which prevents the backflow of liquid through valve 14 when the liquid line 56 is severed or disconnected. Communication of valve 14 with ambient air is described herein in the Description of the Preferred Embodiment of the Invention.

SUMMARY OF THE PREFERRED EMBODIMENTS OF THE ATTACHMENTS TO THE INVENTION

Figure 14:
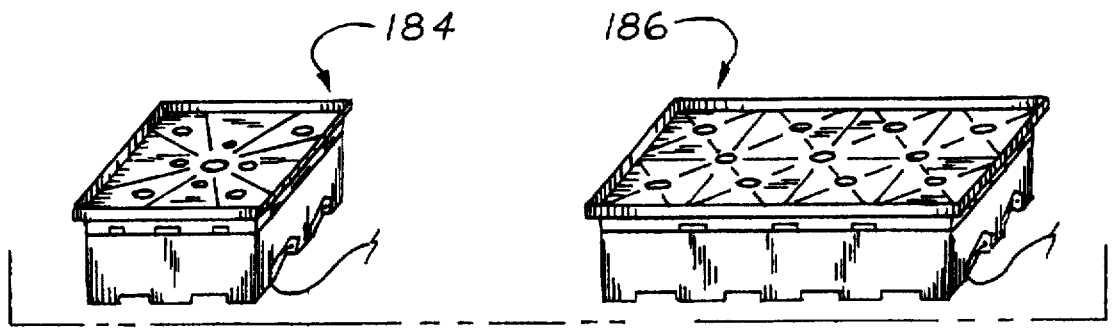
FIG. 14 are oblique sketches showing some optional pot converter shapes as shown in FIG. 13.
Figure 15:
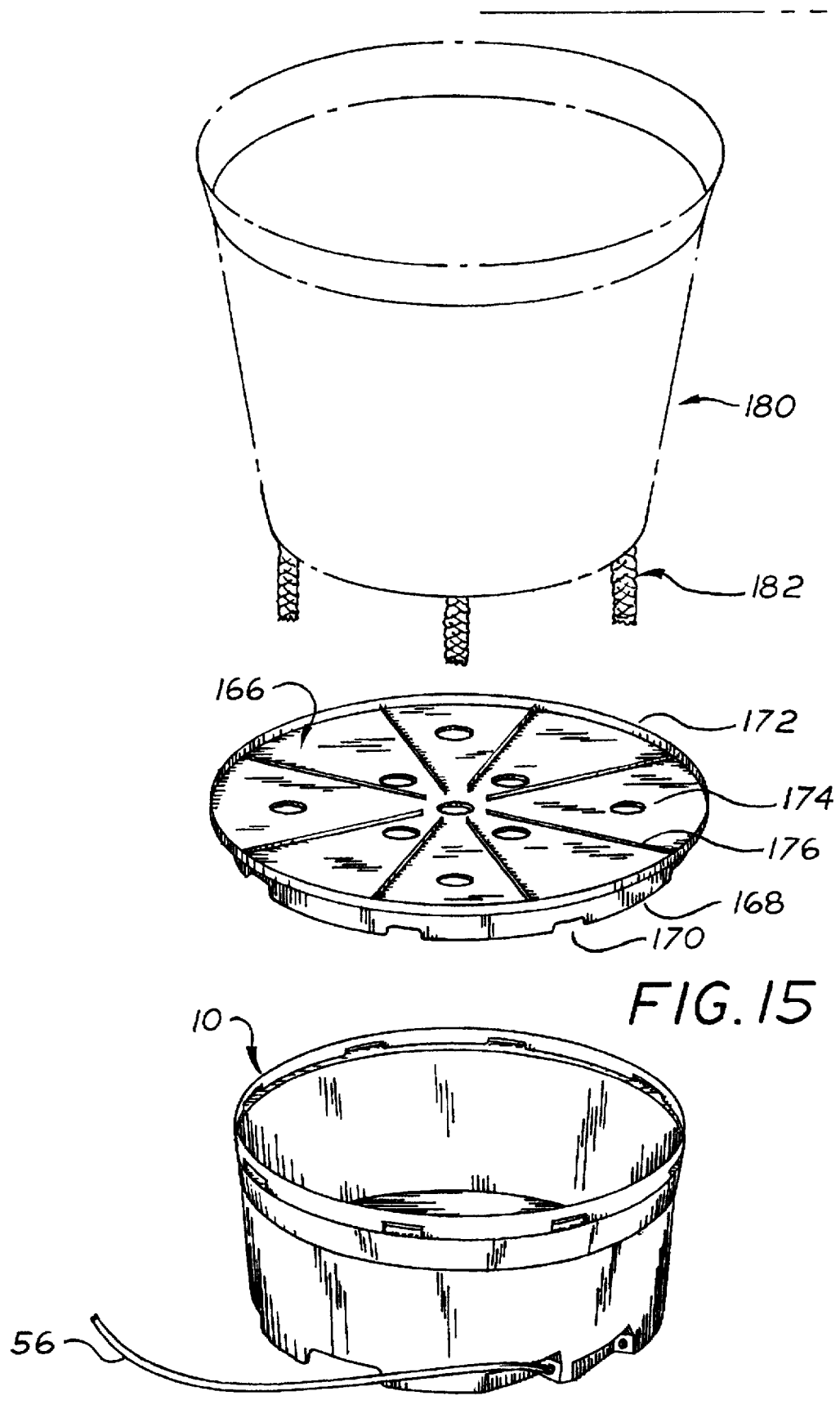
FIG. 15 is an oblique exploded view of the pot converter as shown in FIG. 13 with an existing plant growing pot with wicks.
Figure 19:
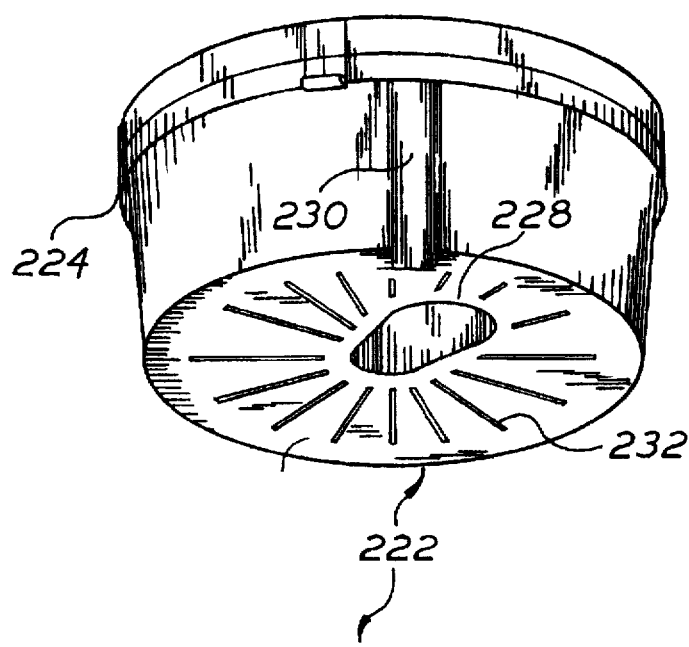
FIG. 19 is an oblique bottom view of the animal waterer attachment for the basin in FIG. 20.
Figure 20:
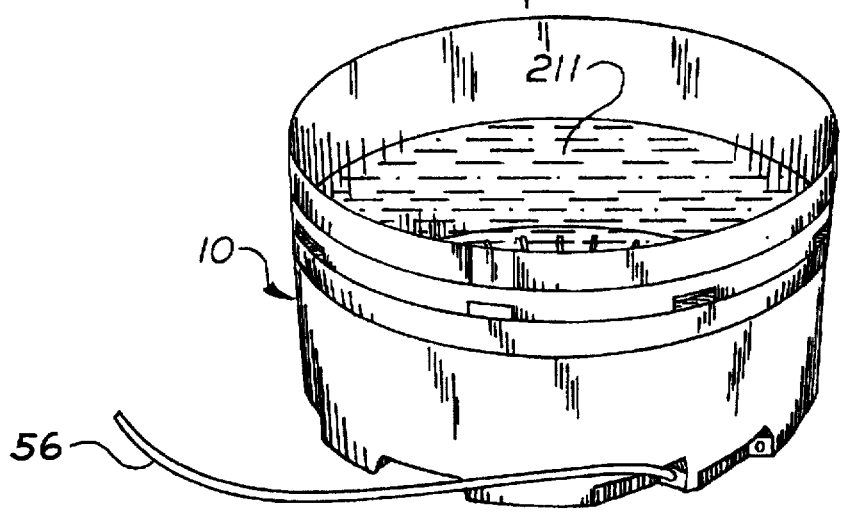
FIG. 20 is an oblique top view of the animal waterer attached to the basin shown in FIG. 4.
Figure 21:
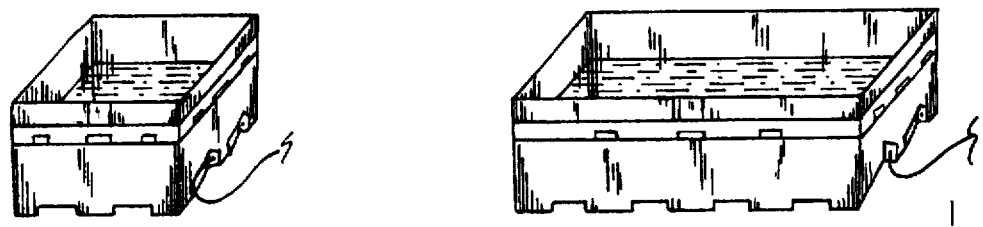
FIG. 21 are oblique sketches showing some optional animal waterer shapes as shown in FIG. 20.
Figure 22:
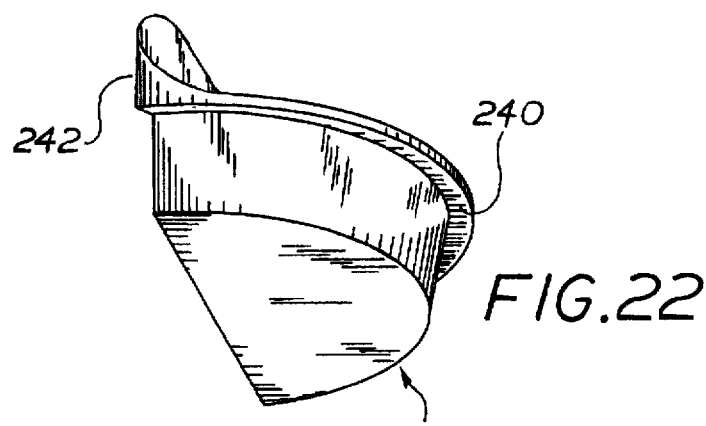
FIG. 22 is an oblique bottom view of the feeder attachment to the animal waterer shown in FIG. 20.
Figure 23:
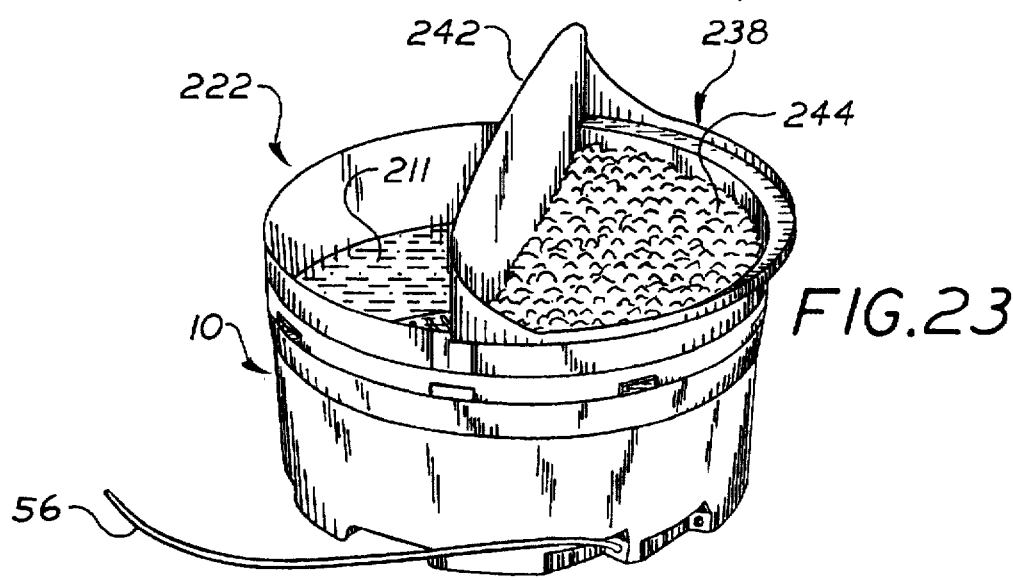
FIG. 23 is an oblique top view of the feeder attachment to the animal waterer shown in FIG. 20.
Figure 24:
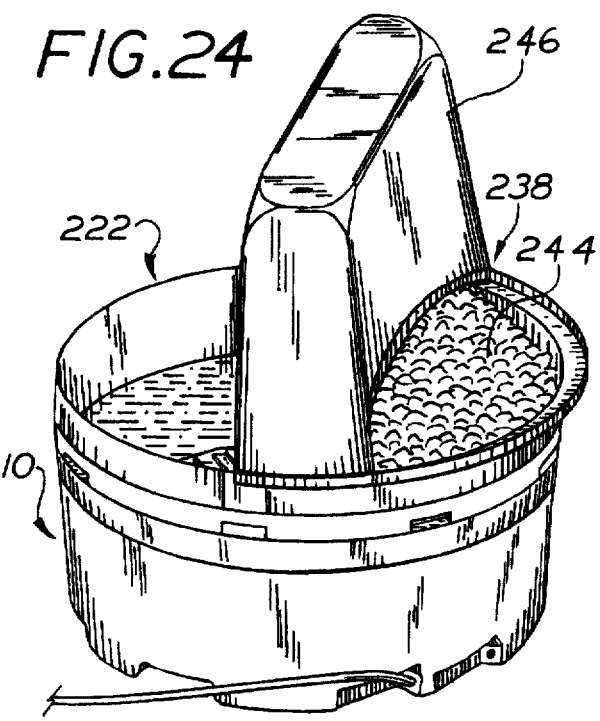
FIG. 24 is an oblique top view of the bulk storage accessory for the feeder attachment shown in FIG. 23.

The pot converter attachment 166 for the basin 10 allows the user to take ordinary plant pots 180 of almost any style or type (bottom or side drainage) and convert them into true self watering pots, or if they wish use them as manual reservoirs they refill. The user places the converter 166 onto the basin 10 by matching the pot converter seating rim 168 and the basin attachment seating rim 74 and rotating the attachment until the two opposing pot converter latches engage the basin vent/latch ports 70. The user then inserts ordinary wicks 182 or quick wicks 188 (see FIGS. 16, 17 and 18) into the drainage holes of their existing pot. The pot converter wick holes 174 on the top surface of the converter 166 allow the wick/s 182 or 188 to pass through and into the water 211 of the basin 10. Capillary wicking and the plants natural osmotic forces will draw water from the basin 10 which will refill automatically. The user can lift the pot by gripping the converter 166 with both hands and pushing one or both of the pot converter latches 150 and twisting and/or lifting up. The converter seating rim 168 which is interrupted by the vent slots 170 that align with the basins vent/latch ports 70, acts as a stable set of feet for the converter attachment 166 when it is removed from the basin 10, thereby preventing damage to the dangling wicks 182. The converter 166 will accept any size pot up to its maximum diameter defined by the pot converter upper rim 172. The converter attachment 166 can be made to fit any size or style basin 10, (examples are the square converter 184 and the rectangular converter 186 shown in FIG. 14) so the converter will accept a wide variety of pots. On the underside of the converter 166 are the support ribs 178, that strengthen the converter unit and pass through the horizontal surface and form on its upper side the drainage elevation ribs 176 that separate the ordinary pot 180 from the converters horizontal surface and enhance ventilation and prevent water from collecting under the pot. The pot converter 166 is particularly suited for converting existing ordinary pots 182 with plants in them into automatic pots instantly when used with either of the tree styles of insertable quick wick 187, 188 and 206. Said quick wicks are made by taking a loose matt of fine polyester and nylon microfilament material 212 and rolling and compressing it into a rolled wick 214, after which an expanding sleeve 196 made of permeable polyester material similar to the lining in diapers is slipped over the rolled wick 214, after which an impermeable cover 194 is slipped over or mapped and sealed around the wick assembly 218. The impermeable cover 194, covers the shaft, no matter what length of the quick wick 187, leaving the top and the bottom of the wick uncovered as shown in FIG. 16. The quick wick cross section 220 shows a view through either of the quick wick sleeves. One of two insertion sleeves can be slipped on the quick wick 187 giving the user two ways to insert them. The removable sleeve 198 allows the user to shove the quick wick 187 into any pot leaving enough of the sleeve visible to be pulled back and off the wick which action is facilitated by the removable sleeve head slits 192 as shown in FIG. 16. The dissolving sleeve 198 is made of hardened gelatin and slips over the wick like the removable sleeve 198 but stays on the wick after insertion into the pot 182 where fluid from below wicks upward and through the dissolving sleeve tip hole 204 which dissolves the sleeve from both inside and out. See FIG. 17 to see examples of the dissolving quick wick 188 at insertion 208 and the dissolving quick wick some time later after the gelatin head has dissolved.

Figure 25:
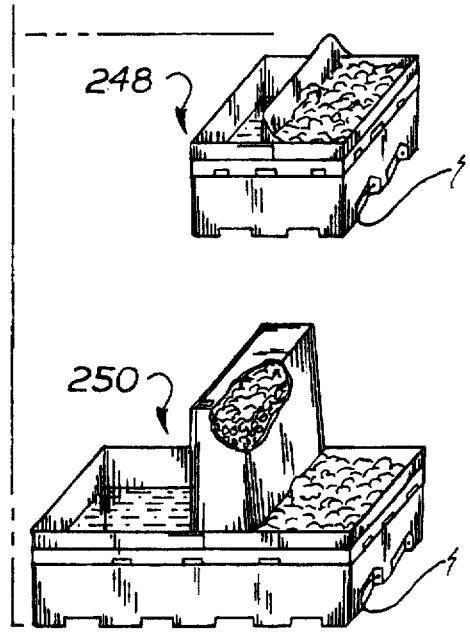
FIG. 25 are oblique sketches showing optional animal waterer/feeder shapes as shown in FIG. 19.
Figure 26:
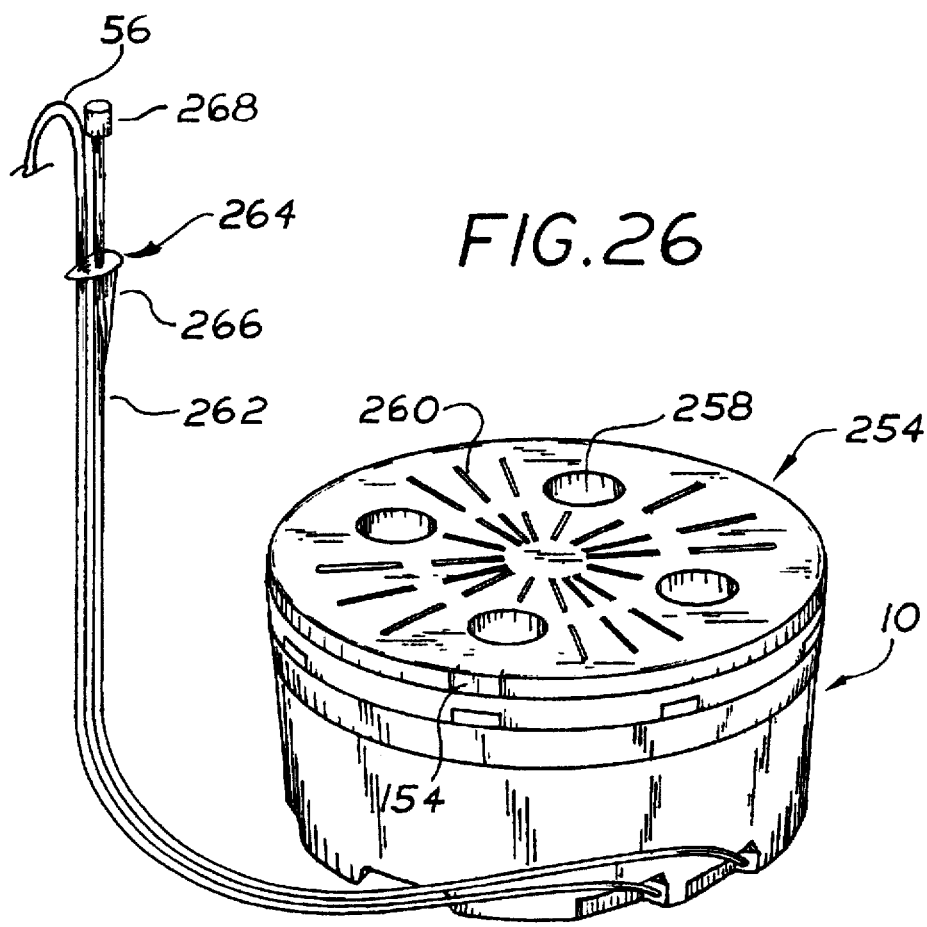
FIG. 26 is an oblique top view of the underground spring attached to the basin shown in FIG. 4.

The animal waterer attachment 222 for the basin 10 creates a water dish for automatic watering of virtually any animal. Many different sizes, styles and attachments can make the watering application more specific, for example the square waterer 248 and the rectangular waterer 250 in FIG. 25 show waterer embodiments with food handling accessories while the square waterer 234 and rectangular waterer 236 are shown without accessories. The user places the waterer 222 onto the basin 10 by matching the waterer seating rim 224 and the basin attachment seating rim 74 and rotating the attachment until the two opposing waterer latches 152 engage the basin vent/latch ports 70. The waterer attachment 222 snaps on to and off the basin 10 without the use of tools. The basin 10 itself can be mounted or screwed to surfaces which can prevent most animals from moving the waterer 222 when it is connected and latched to the basin. The waterer 222 is shaped to nest within the basin 10 and has an integrally molded valve cover 228 to protect the valve 14 and an integrally molded snorkle clearance channel 230 to protect the basin snorkle assembly 26. The waterer 222 has water slots 232 through the horizontal surfaces of the attachment allow for water circulation. The entire interior surface is smooth so as to be 'tongue safe' and also be easily cleaned. The basin drain discharge line 60 can also be attached and regulated with an in-line micro-drain regulating valve 62 to drip water to another site (e.g. a planter or tree) thus allowing the user regulated, constant replacement of the water in the waterer. When the waterer 222 is supplied by typical municipal chlorinated water, the waterer could, in its optimum configuration (with regulated drain), function perpetually with little or no maintenance. Water consumption rates, location and other variables have an affect on the maintenance requirements, however the unit would able to be left for extended periods of time without attention. The waterer attachment 222 food accessory 238 slips onto the edge of the waterer using the food accessory seating rim 240 around its 180 degree circumference. Food 244 is protected from splashing water by the food accessory splash guard 242 that divides the waterer attachment 222. For longer term food storage the bulk food container 246 accessory for the food accessory will hold and dispense food for longer periods of time.

Figure 27:
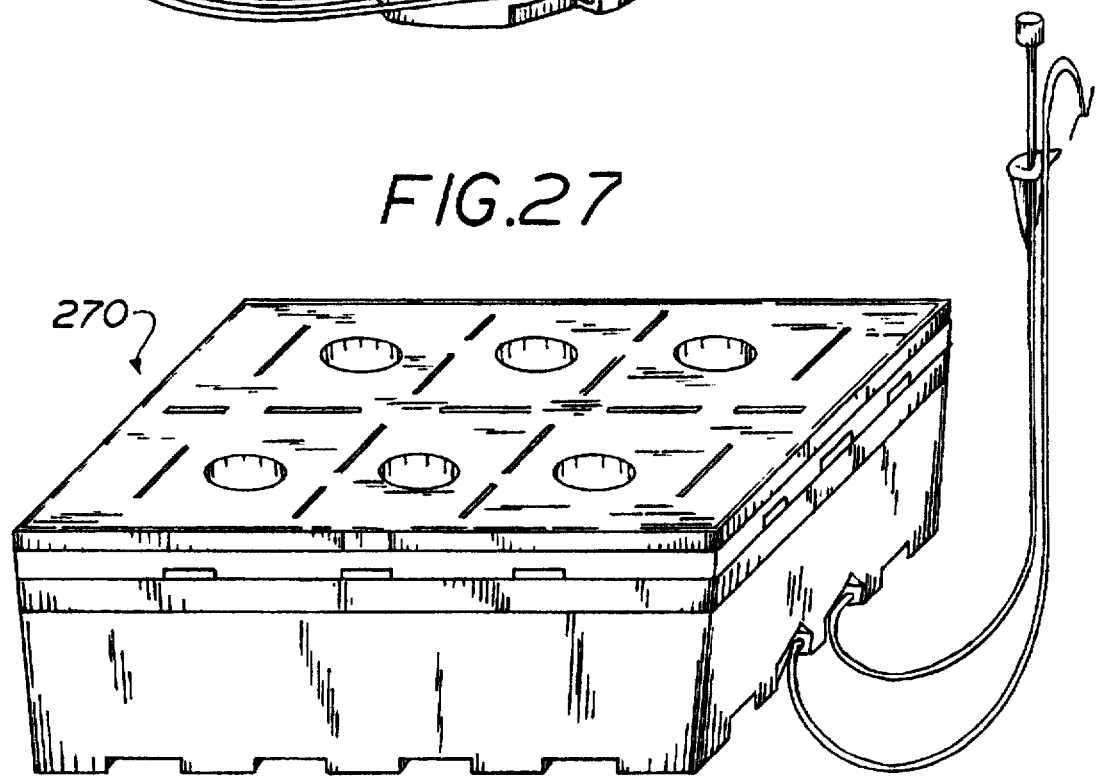
FIG. 27 are oblique sketches showing optional underground spring shapes as shown in FIG. 26.
Figure 28:
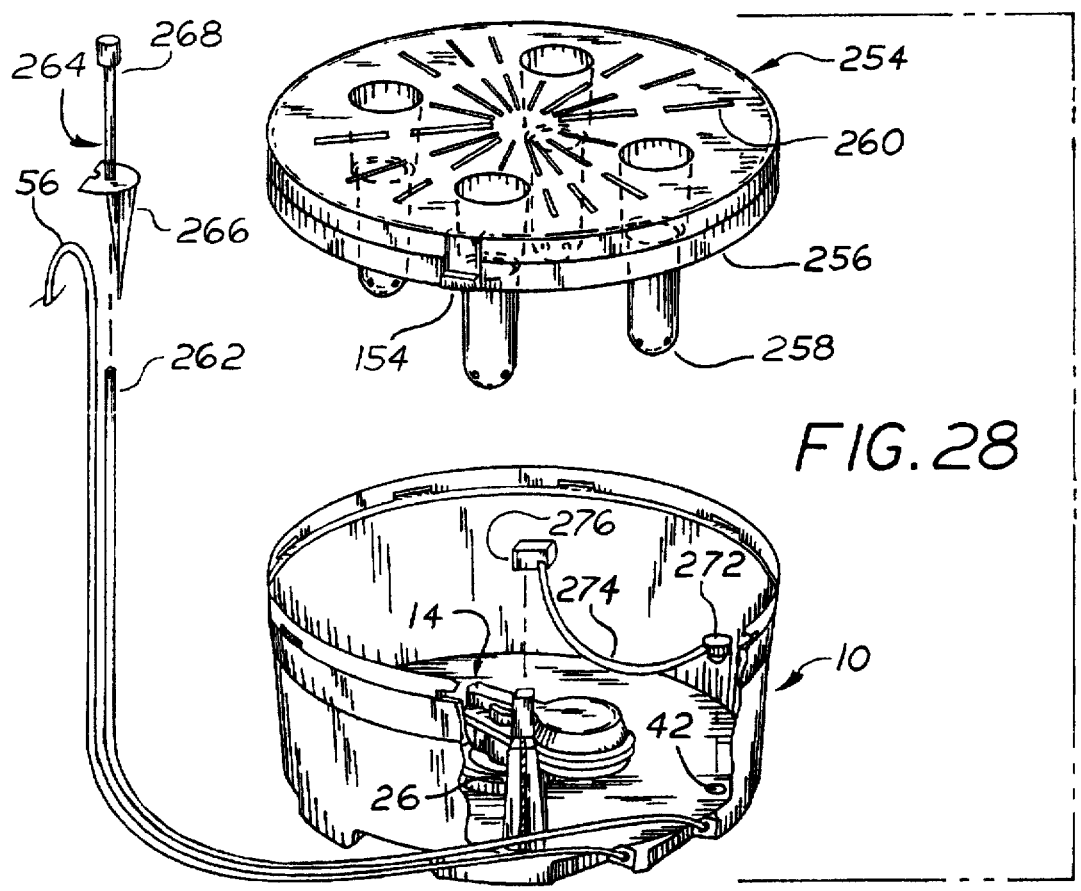
FIG. 28 is and oblique exploded view of the underground spring shown in FIG. 26.
Figure 29:
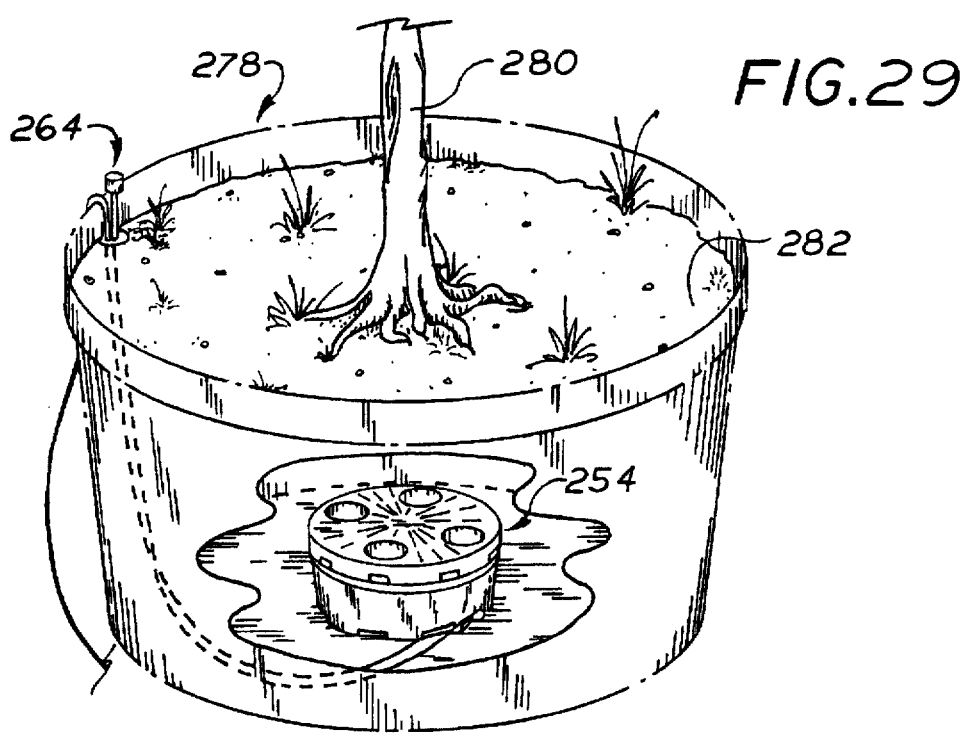
FIG. 29 is en oblique cutaway view of the underground spring as shown in FIG. 26 in a large planter with tree.
Figure 30:
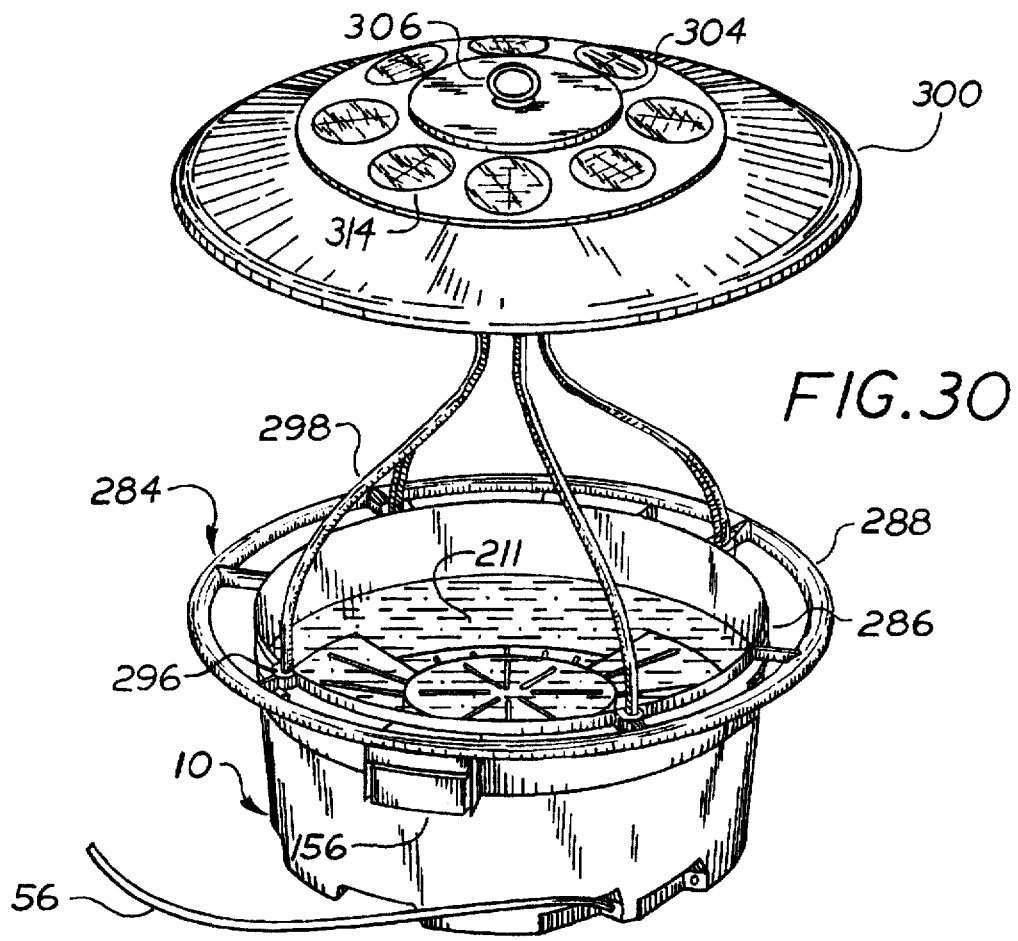
FIG. 30 is an oblique top view of the bird bath attached to the basin shown in FIG. 4.

The underground spring attachment 254 for the basin 10 creates an implantable water source for plants particularly suited for large planters and also placement in the earth under valuable trees etc. The basin 10 is first modified by removing the snorkle cap 24 and replacing it with the basin snorkle air adapter cap 276 which is connected by the basin air adapter hose 274 and to the basin drain port air adapter 272 that fits into the internal basin drain line port 42. The correct installation of said air adapter assembly will port ambient air to and from the valve 14 using the external drain line port 38 as the air channel to the surface. The user places the underground spring attachment 254 onto the basin 10 by matching the spring seating rim 256 and the basin attachment seating rim 74 and rotating the attachment until the two opposing spring latches 154 engage the basin vent/latch ports 70. The underground spring air line 262 is then connected to the external drain line port 38 and the fluid delivery line 56 is connected to the basin external fluid line port 18 and both air and water lines run up and out of either the hole dug in the ground or the walls of the large planter where the sprig 254 is located. The air line 262 is then connected to the external snorkle 264 and snorkle screen 268 and the support stake 266 and either stuck in the edge of the planter or in the ground near the plant once it has been planted on top of the underground spring. The user may also option to attach the external snorkle 264 to the plant itself especially if it is a tree 280 as this will prevent possible damage to a ground based snorkle. When the assembly of the underground spring 254 is complete the user fills the dirt or media wicks 258 with dirt or other desired media and places the spring in the bottom of the hole. Quality soil 282 is then distributed around and on top of the spring to a depth of a few inches at which point the plant can be put in place and planting finished. The wicks 258 will move water upward into the plant root ball which in turn will grow down into the underground spring wicks 258 and vent slots 260. After a few years when the tree roots have overwhelmed the spring 254 it can be shut down and the air and water lines cut off. The underground spring 254 could significantly enhance the survivability of valuable ornamental and fruit trees and would theoretically increase vegetative growth rates and fruit yields especially if fertilizers are fed into the underground spring in the water stream. Many different sizes and styles of underground spring 254 could be made to meet different requirements with one example being the rectangular underground spring 270 shown in FIG. 27 which could provide automatic watering for large planters in malls, restaurants and other large facilities.

Figure 31:
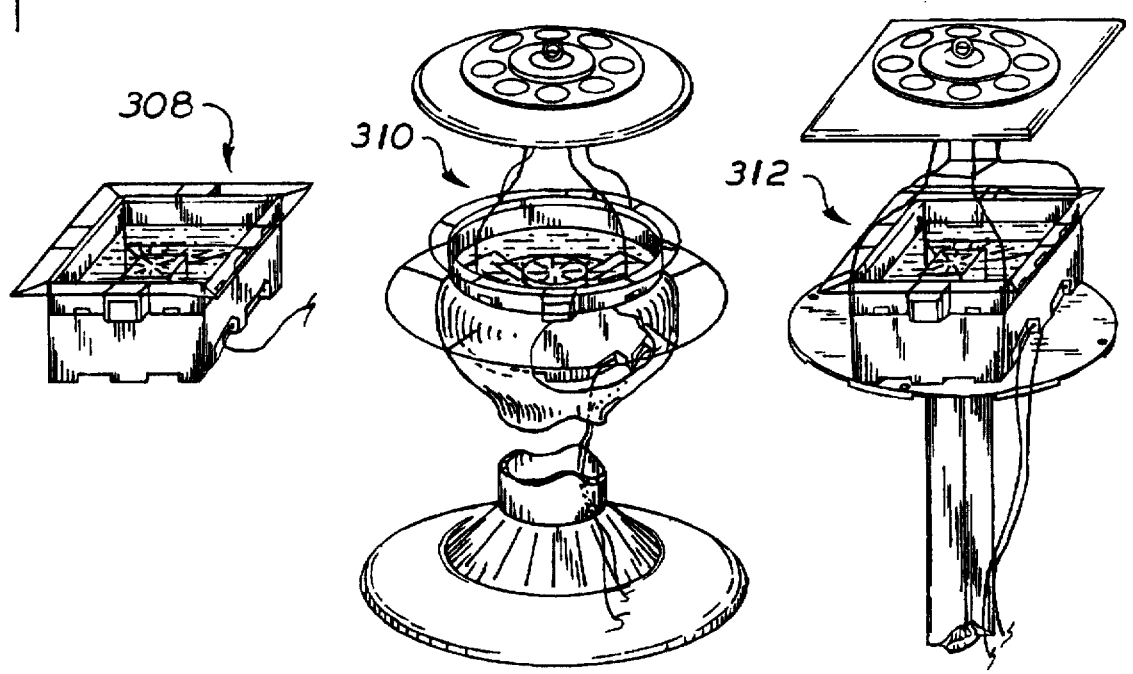
FIG. 31 are oblique sketches showing some optional bird bath shapes as shown in FIG. 30.
Figure 32:
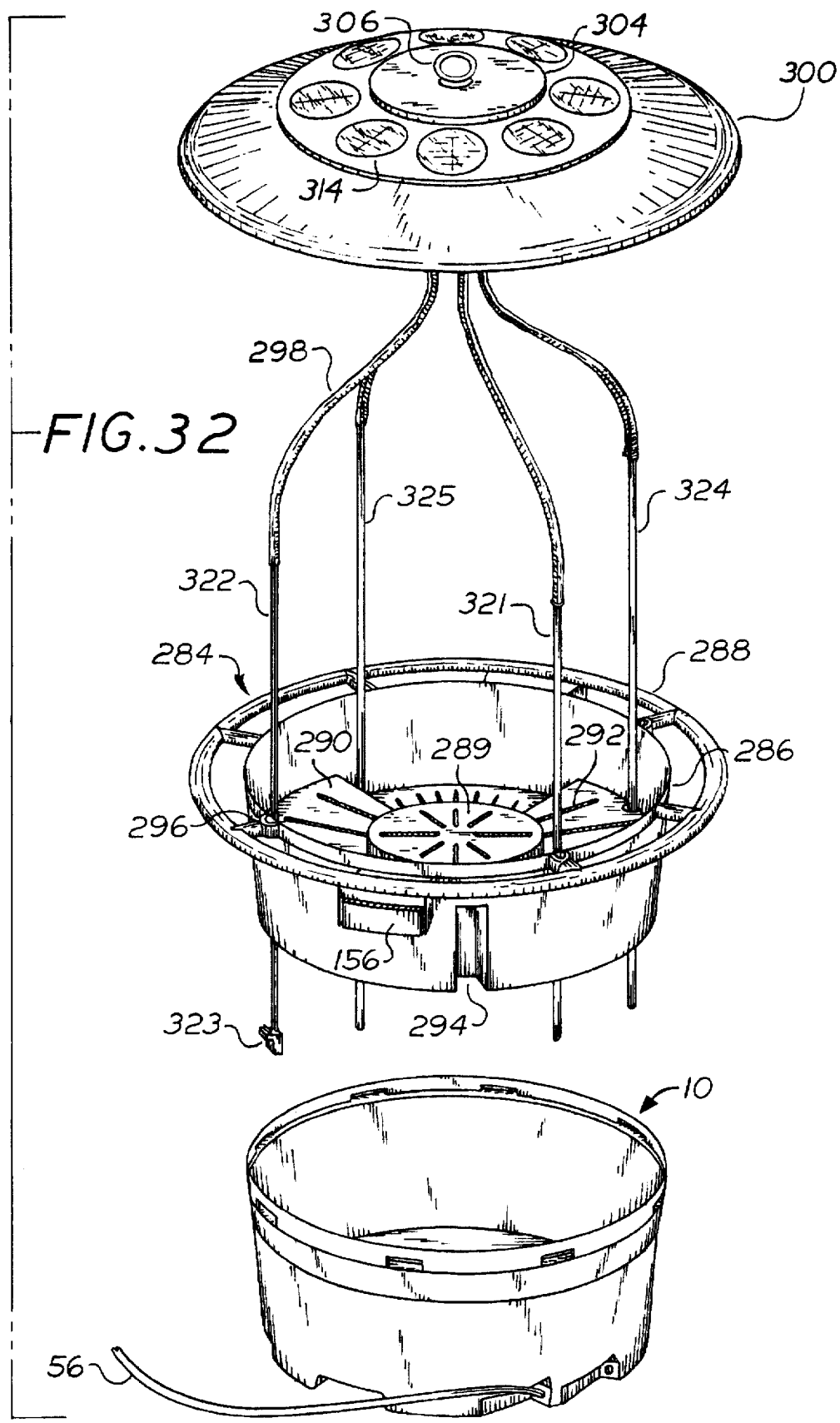
FIG. 32 is an oblique exploded view of the bird bath shown in FIG. 30 with optional solar powered bird shower.
Figure 33:
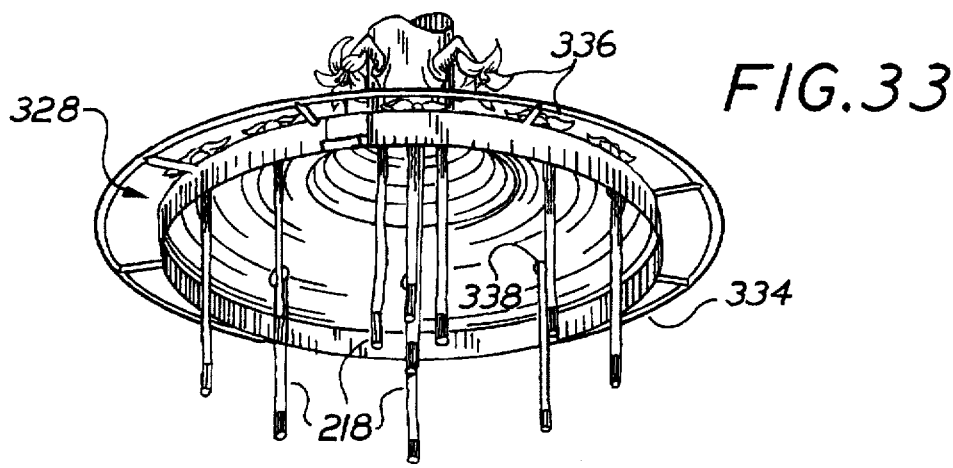
FIG. 33 is an oblique bottom view of the humminbird feeder attachment for the basin in FIG. 4.
Figure 34:
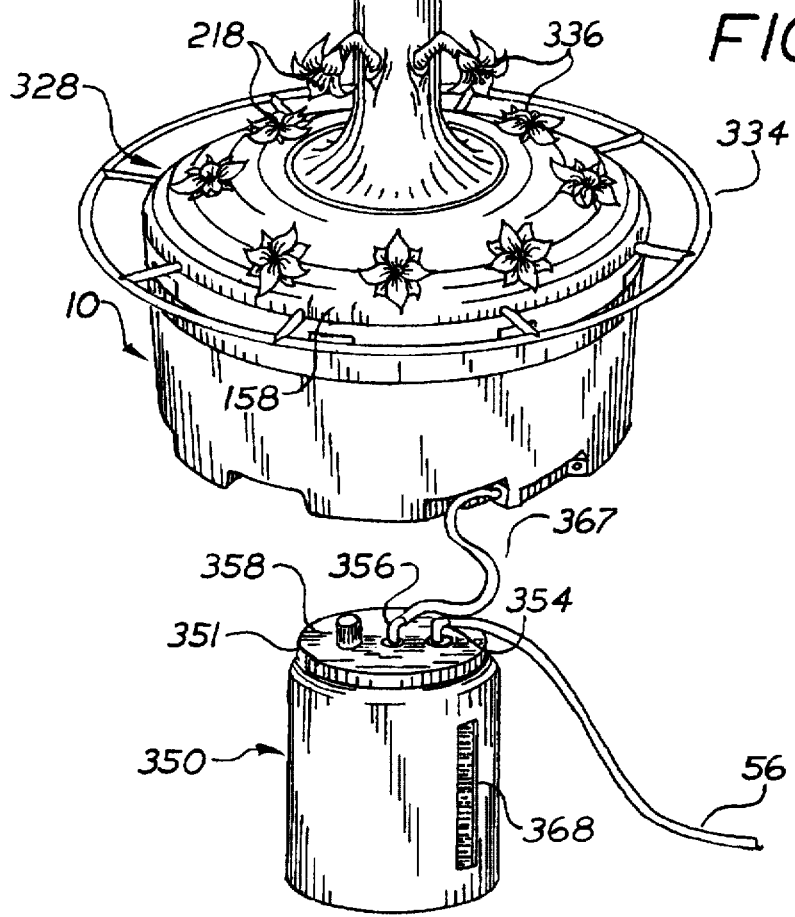
FIG. 34 is an oblique top view of the hummingbird feeder attached to the basin shown in FIG. 4 with food solution bladder storage and pressure unit.
Figure 36:
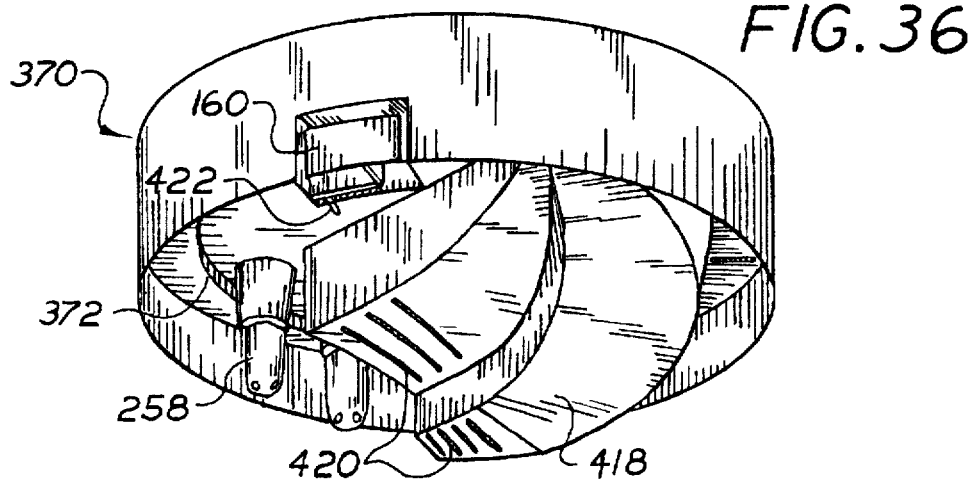
FIG. 36 is an oblique bottom view of the amphibian habitat attachment for the basin in FIG. 4.
Figure 37:
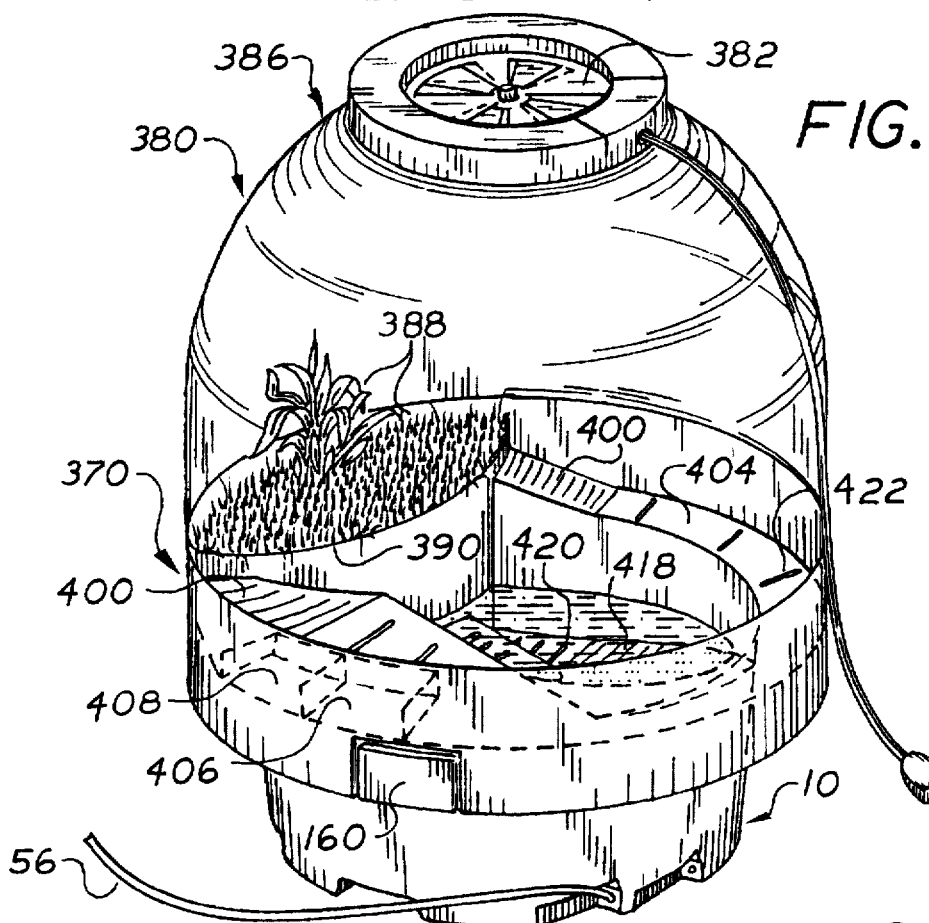
FIG. 37 is an oblique top view of the amphibian habitat attached to the basin shown in FIG. 4.

The bird bath attachment 284 for the basin 10 creates a truly automatic bird bath that does not need refilling by the user and can be easily cleaned. The user places the bird bath attachment 284 onto the basin 10 by matching the bird bath seating rim 286 and the basin attachment seating rim 74 and rotating the attachment until the two opposing bird bath latches 156 engage the basin vent/latch ports 70. Birds may land on the perch 288 surrounding the bird bath 284 and then jump to the shallow or dry platform valve cover 289 (user adjusts water level) in the center and descend into the multi level bath floor 290 equipped with water slots 292 that serve the dual purpose of allowing free passage and circulation of water and also create excellant gripping surface for the birds feet. The stepped and vented platform descends around the valve 14 and past the snorkle clearance channel 294 allowing birds to select the depth of water within which they wish to bathe. The bird bath accessory rim 296 and the bird bath accessory rim support 298 provide a means for having the bird bath 284 and for supporting the optional umbrella 300 its reinforcing disc 304 which are all hung from the hanging ring 306. To prevent water fouling and stagnation the user may clean the unit easily and it will refill itself, or for even longer periods between cleaning the user may attach a micro-valve 62 controlled line to the basin external drain line port 38 and drip water to a neighboring planter, bush, tree, etc. Slowly feeding the typical chlorinated municipal water through the bird bath 284 will help to control algae, fouling and stagnation and keep a far fresher water for the birds to bathe in and drink. The bird bath attachment 284 could be made in many different sizes and styles such as the square bird bath 308, the bird bath pedestal embodiment 310 and the bird bath post mount embodiment 312 shown in FIG. 31. Additional options for the bird bath 284 are the fresh water trough 322 drinking water station suspended under the bird bath accessory rim support 298 and surrounded by the water trough perch 326 and fed by the water trough supply line 324 from the vale 14 in the basin 10. Water would enter the fresh water trough 322 first and then fill the bird bath 284 below. Spillage, splashage, consumption and evaporation from either the fresh water trough 322 or the bath 284 would be replaced with water originating from the fresh water trough thus allow the fresh water trough to always have the freshest water. The bird shower accessory would create a shower head 320 suspended from the center of the bird bath accessory rim support 298 and fed through the shower supply line 318 which is supplied by the optional submersible fluid pump 138 which (in this embodiment) is powered by solar panels 314 mounted on the umbrella 300 with the solar panel electric wire assembly 316 running down one of the accessory rim supports 298 where the wire assembly terminates at the solar electric basin terminal adapter 317 which is connected to the submersible fluid pump 138. Whenever the solar panel 314 covered umbrella 300 was exposed to sunlight of sufficient strength (to trigger a voltage sensor and relay) the pump 138 would operate continuously and create the bird shower.

The hummingbird feeder attachment 328 (feeder) for the basin 10 allows the user to feed hummingbirds with a safe, end when combined with the pressure bladder 348, continuous supply of sterile hummingbird food solution 366. The feeder 328, when used manually and without the pressure bladder 348 has a large reservoir for storing feeding solution 366 which when exhausted is replaced by the user. The hummingbird solution 366 is fed from the basin 10 though wicks 187 and 188 to the artificial flowers 336 located around the top of the bottom portion and the stem of the feeder attachment 328. A humming bird perch 334 surrounds the feeder 328 and an optional umbrella 300 will provide shade and can be colored to attract humming birds. The user places the humming bird feeder attachment 328 onto the basin 10 by matching the humming bird feeder seating rim 330 and the basin attachment seat rim 74 and rotating the attachment until the two opposing humming bird bath latches 158 engage the basin vent/latch ports 70. The assembled feeder 328 can be placed on surfaces, attached to surfaces or hung. In combination with the pressure bladder 348 the feeder 328 becomes a true self feeding system capable very long operation without requiring user refilling or maintenance. Two inherent weaknesses in existing hummingbird feeders are eliminated by the pressure bladder/ feeder 328 combination. The first, and very often fatal (to the bird) flaw is the loss of food supply. Existing feeders have small reservoirs of food and are prone to run out of solution unless dutifully refilled by the human user. Birds that become dependent on the feeders will often die if the supply is cut off due to human error, laziness, vacation or any reason that stops the continuous refilling. Also, feeders that have larger reservoirs to try to compensate for the prior flaws run into the equally difficult problem of airborne yeast continuation which will render the solution alcoholic and unpalatable to the birds, again cutting of the supply. The feeder/ pressure bladder 328 combination allows the human user to store many gallons (if desired) of solution 366 in a sterile flexible opaque solution bag 360 that is inside the pressure bladder vessel 350 that is fed by a pressurized water delivery line 56 that enters the vessel 350 through the bladder water line fitting 354 located on the bladder vessel cap 351 (and after trapped air is exhausted using the air pressure relief valve 358) the water applies equal pressure around the solution bag 360 thereby forcing solution 366 through te collection tube screen 364 and up into the collection tube 362 and out of the solution bag 360 through the bladder solution line fitting 356 and then through the solution line 367 to the enclosed wick cup 340 compartment in the basin 10. The wick cup 340 has a external mounting cam 342 that is identical to the valve base 100 and twists into the valve mounting flange 82 in the basin 10. The valve 14 then twists into the inside valve mount 344 located on the bottom of the wick cup 340 which when in place can have the wick cup cover with wick holes 346 put in place and the wicks 187 or 288 into the feeder attachment wick holes 338 and down through the cup cover wick holes 346 and into the solution 366. The user may check the inventory of food solution 366 through the vessel sight glass 368. The humming bird feeder 328 when operated automatically, effectively eliminates the problem of interrupted food supply, plus the sealed container and delivery system eliminates the yeast contamination problem. Accessory flowers (not shown) that math regional flowers and would be more specific to the humming birds being attracted, could replace the standard flowers. Also different flowers could be placed around the feeder and the user could watch and determine which flowers best appeal to the birds they wish to attract.

Figure 38:
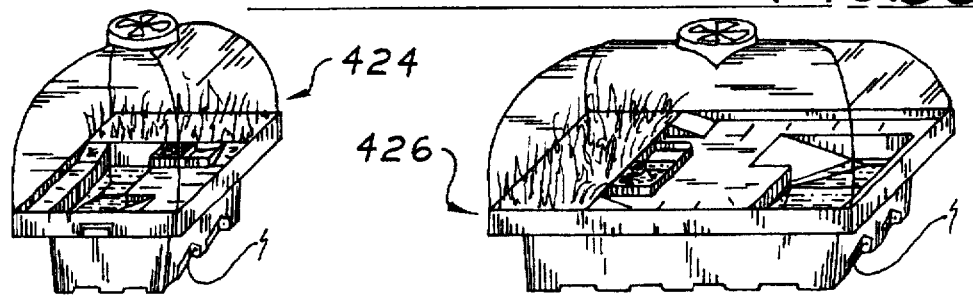
FIG. 38 are oblique sketches showing some optional amphibian habitat shapes as in FIG. 37.
Figure 40:
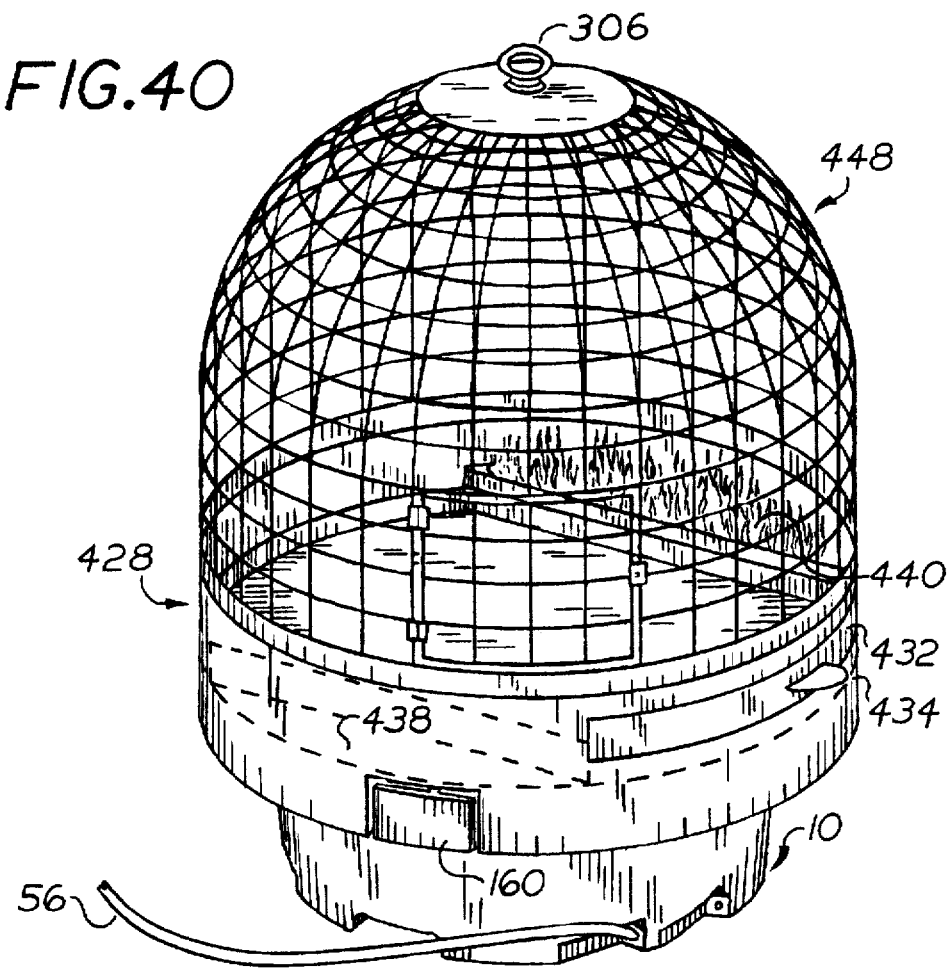
FIG. 40 is an oblique top view of the animal/bird cage attached to the basin shown in FIG. 4.

The amphibian attachment 370 (habitat) for the basin 10 creates a truly automatic amphibian habitat that does not need refilling by the user and can be easily cleaned. The user places the habitat attachment 370 on the basin 10 by matching the habitat seating rim 372 and the basin attachment seating rim 74 and rotating the attachment until the two opposing habitat lathes 160 engage the basin vent/latch ports 70. Turtles, salamanders, newts and other amphibians may travel around the habitat and encounter a plant area 390 filled with plants 388 appropriate for the species supported and then descend the plant area ramps 400 and on to the inner deck 404 where the food bowl 406 and water bowl 408 are located. The habitat 370 is equipped with a water pool with pool vent slots 420 that serve the dual purpose of allowing free passage and circulation of water and also create excellent gripping surface for the amphibians. The pool floor 410 with its stepped and vented platform descends around and over the valve 14 allowing amphibians to select the depth of water they want. The amphibian rim top 376 accepts the clear plastic dome 380 that can cover the habitat 370 to keep the amphibians in and the worst of the elements out. The dome 380 is equipped with an air dome vent 382 that ventilates the habitat 370 and is controlled by the dome vent adjustment knob 384. The dome 380 can also have the optional dome light 386 to supply light for all the life forms contained in the habitat 370 and to light the habitat for the user. Habitat 370 air is moved upward by convection currents from the amphibian attachment ventilation slots 422 and through the dome vent 382 and out of the habitat. To prevent water fouling and stagnation the user may clean the unit easily and it will refill itself or for even longer periods between cleaning the user may attach a micro-valve 62 controlled line to the basin external drain line port 38 and drip water to a neighboring planter, bush, tree, etc. Slowly feeding the typical chlorinated municipal water through the habitat 370 will help to control algae, fouling and stagnation and keep a far fresher water for the amphibians to bathe in and drink. The amphibian attachment 370 could be made in many different sizes and styles such as the square habitat 424 and the rectangular embodiment 426 shown in FIG. 38. The habitat 370 has a fresh water bowl 408 drinking water station that is fed by the valve 14 in the basin 10. Water enters the fresh water bowl 408 through a hose connected to the valve 14 and into the fresh water inlet nipple 410 which is the back of the fresh water supply hole 412 to the fresh water bowl 408 where excess water passes through the over flow hole 414 and down through the over flow nipple 410 and into the basin/pool. Spillage, splashage, consumption and evaporation from either the fresh water bowl 408 or the pool would be replaced with water originated from the fresh water bowl thus allowing the fresh water bowl to always have the freshest water.

Figure 41:
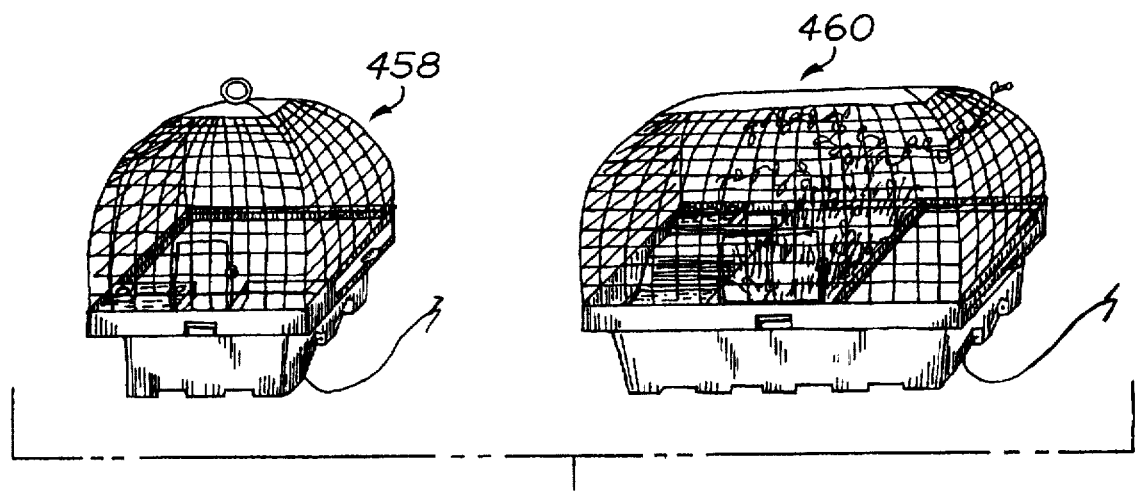
FIG. 41 are oblique sketches showing some optional animal/bird cage shapes as shown in FIG. 40.
Figure 43:
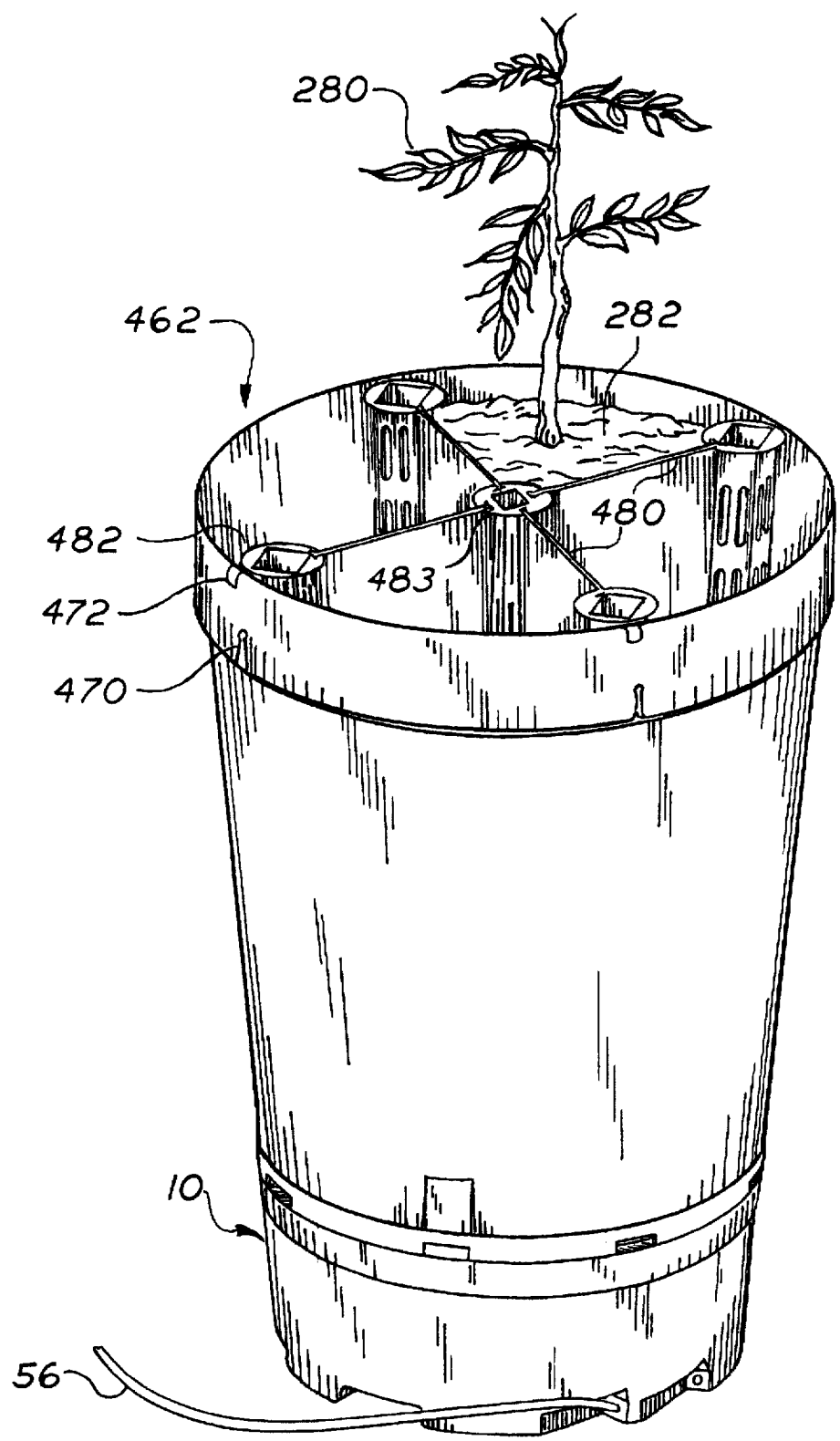
FIG. 43 is an oblique top view of the gardener attached to the basin shown in FIG. 4.

The animal/bird cage attachment 428 (cage) for the basin 10 creates a small animal or bird cage that contains within it a fresh water bowl 440 that is connected by a small hose connected to the fresh water bowl inlet 442 and to the valve 14 in the basin. The cage attachment 428 does not need a filled reservoir so the valve 14 is connected directly to the fresh water bowl 440 where it senses the water level and maintains it as it does in the basin 10. There is a water bowl overflow that passes into the basin 10 in the event of any spillage or failure. The user places the cage attachment 428 onto the basin 10 by matching the cage seating rim 430 and the basin attachment seating rim 74 and rotating the attachment until the two opposing cage latches 160 engage the basin vent/latch ports 70. The cage attachment rim 446 which circles the top edge of the attachment accepts the cage seating rim 450 upon it. By pulling the tray handle 434 the user can remove the sliding pull out tray 432 that covers most of the flat cage bottom 436. A food trough 438 holds food for the animals placed there by the user. A cage engaging ring 456 allows the user to hang the cage attachment 428. The interior of the cage is accessed through the cage door 454. The cage attachment 428 could be made in many different sizes and styles such as the square cage 458 and the rectangular cage 460 shown in FIG. 41.

The gardener attachment 462 (gardener) for the basin 10 creates a multi-featured plant growing system. The user places the gardener attachment 462 onto the basin 10 by matching the gardener seating rim 464 and the basin attachment seating rim 74 and rotating the attachment until the two opposing gardener latches 160 engage the basin vent/latch ports 70. If the user wishes the latches 160 need not be engaged in the basin vent/latch ports 70 allowing the gardener 462 to rotate on the basin attachment seating rim 74 and thus allow the user to select the air flow rates desired with the use of the bottom rim vent slots 466. The four soil or media filled wicks/legs 258 drop from the gardener 462 into the water in the basin 10. Capillary action draws the water up and the plants osmotic action accelerates and regulates the water flow.

The user, after connecting a drip line 56 to the Basin will not have to water the plant again unless his water supply 58 is stopped. With the use of exist standard in-line fertilizing devices and using water soluble nutrients, the user can also automatically fertilize the plant.

Figure 45:
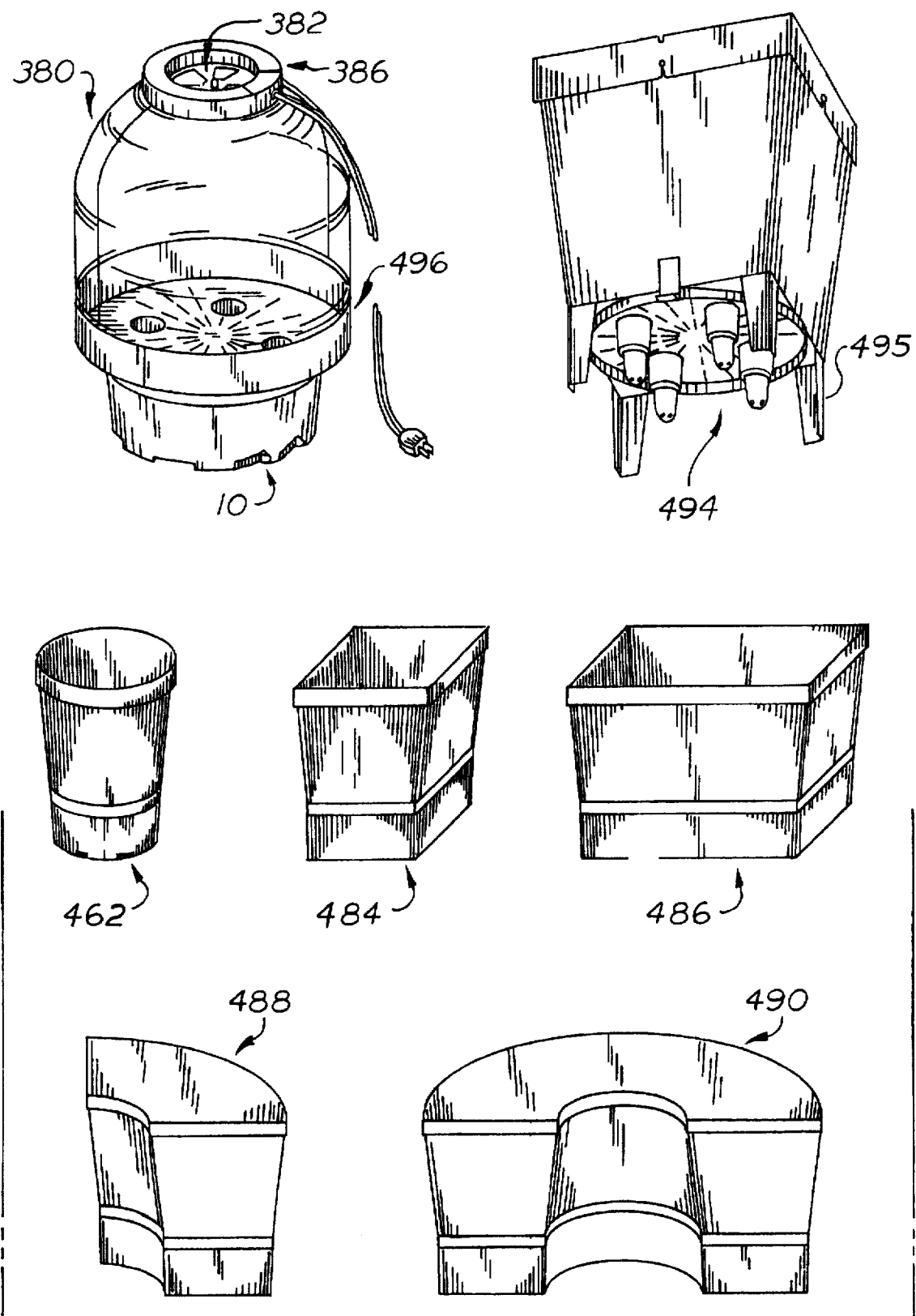
FIG. 45 are oblique sketches and plan diagrams of optional gardener shapes as shown in FIG. 43.
Figure 46:
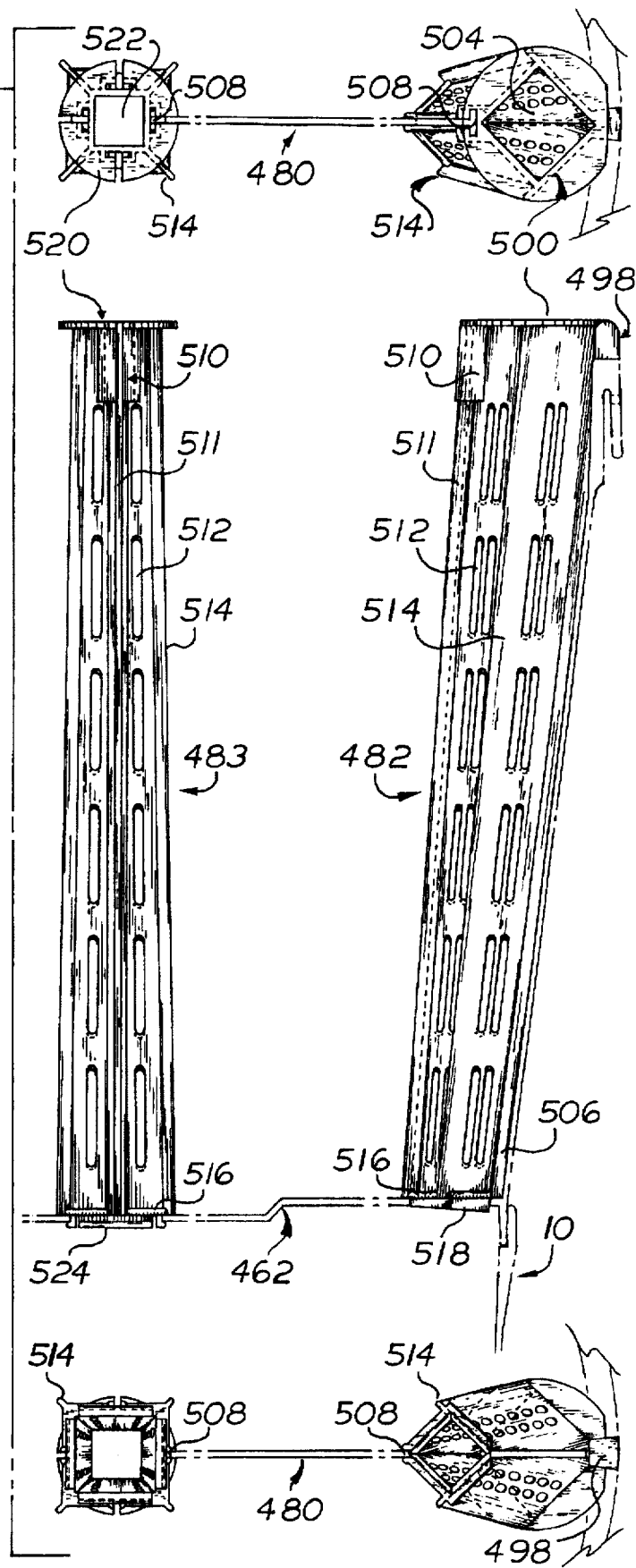
FIG. 46 are top, bottom and side views of the areating root pruners that fit the gardener attachment as shown in FIG. 43.
Figure 47:
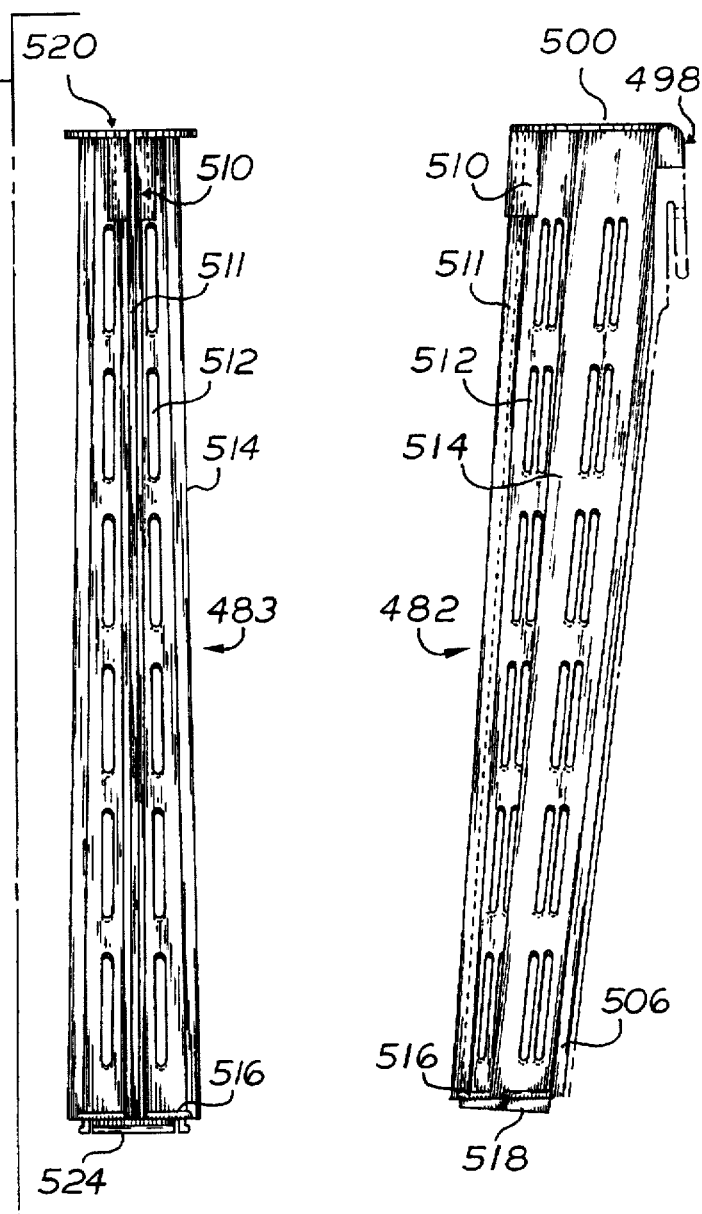
FIG. 47 is an oblique view of the outer wall and inner column areating root pruners as in FIG. 46.
Figure 48:
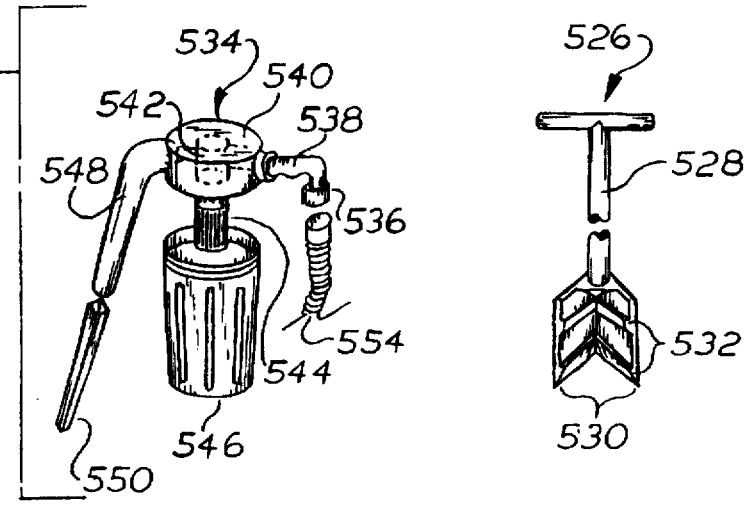
FIG. 48 are oblique sketches showing optional accessories for the areating root pruners in FIG. 47.
Figure 51:
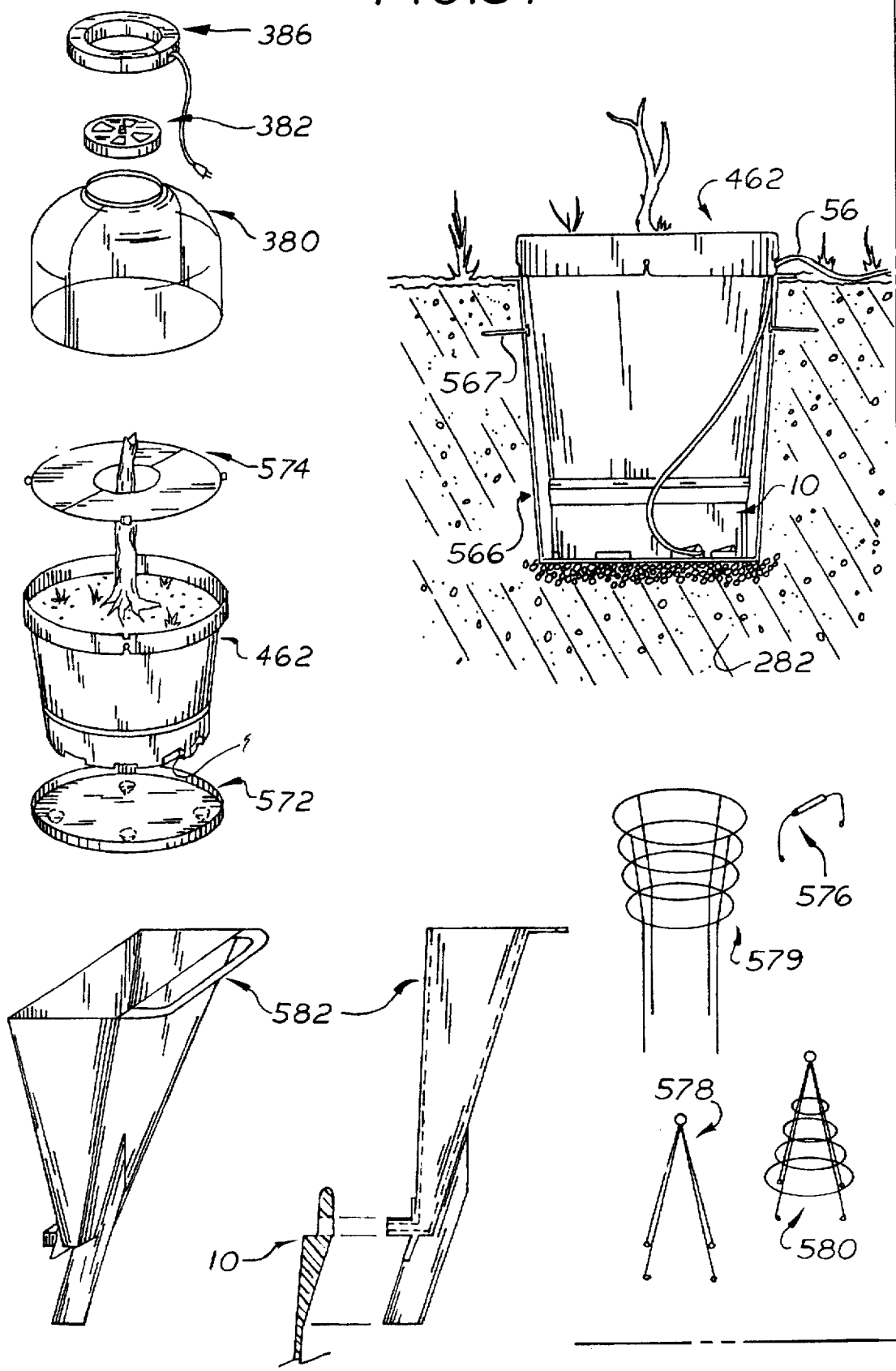
FIG. 51 are oblique views of the bury bucket, funnel, top cover, decorative side covers and tray accessories for the gardener attachment shown in FIG. 43 and the basin as shown FIG. 4.
Figure 52:
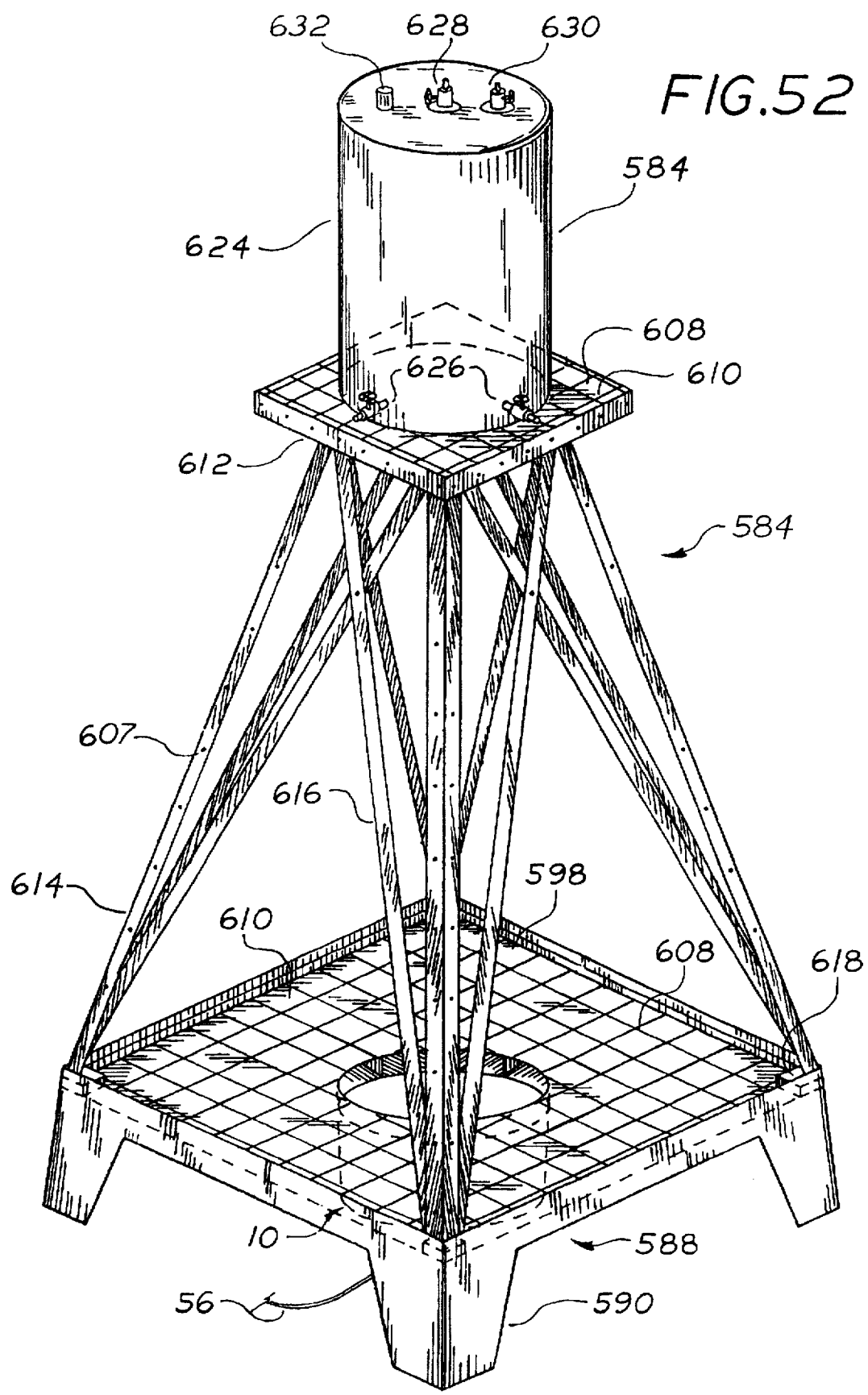
FIG. 52 is an oblique top view of the water toy attached to the basin shown in FIG. 4.
Figure 53:
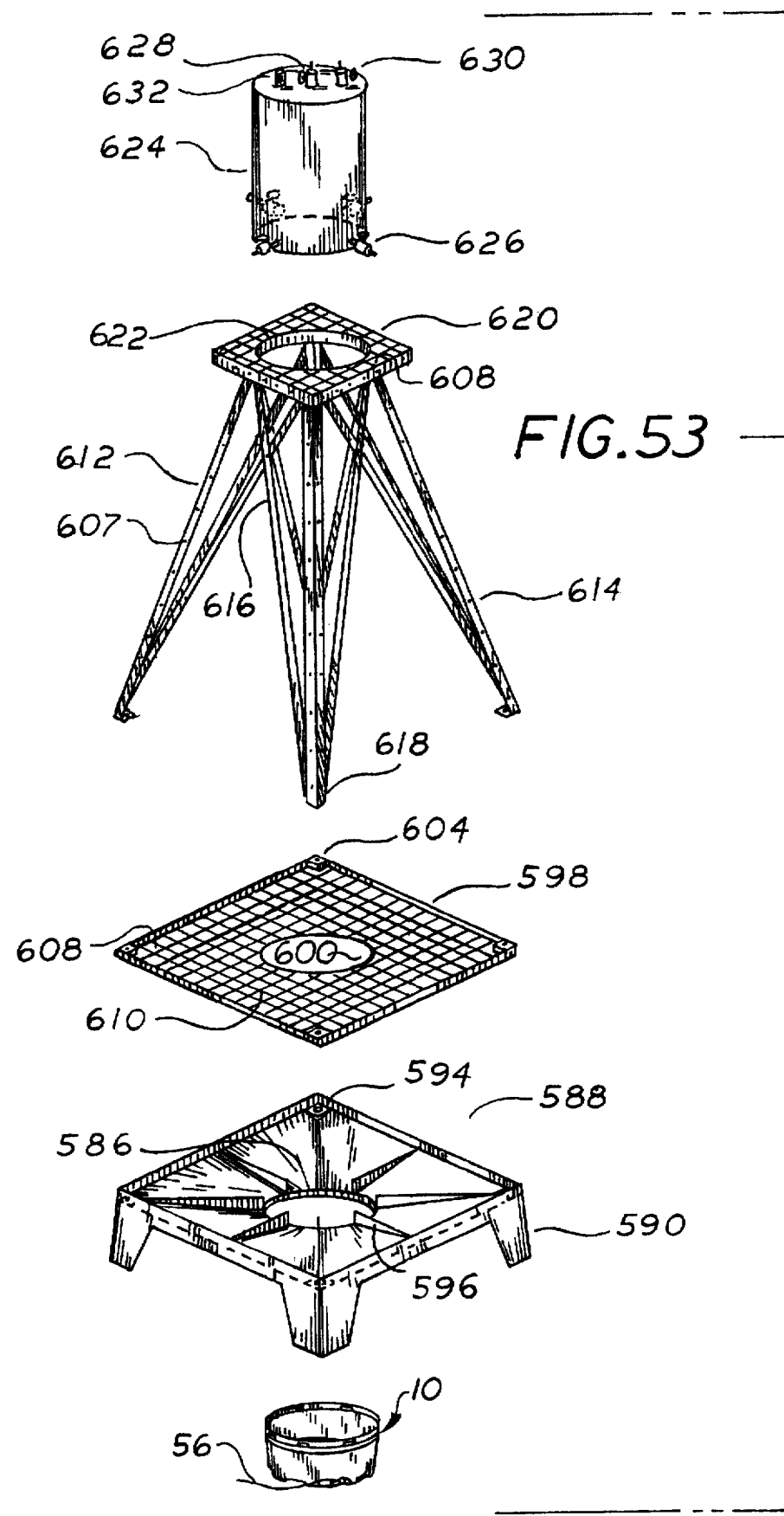
FIG. 53 is an oblique exploded view of the water toy attachment shown in FIG. 52.
Figure 54:
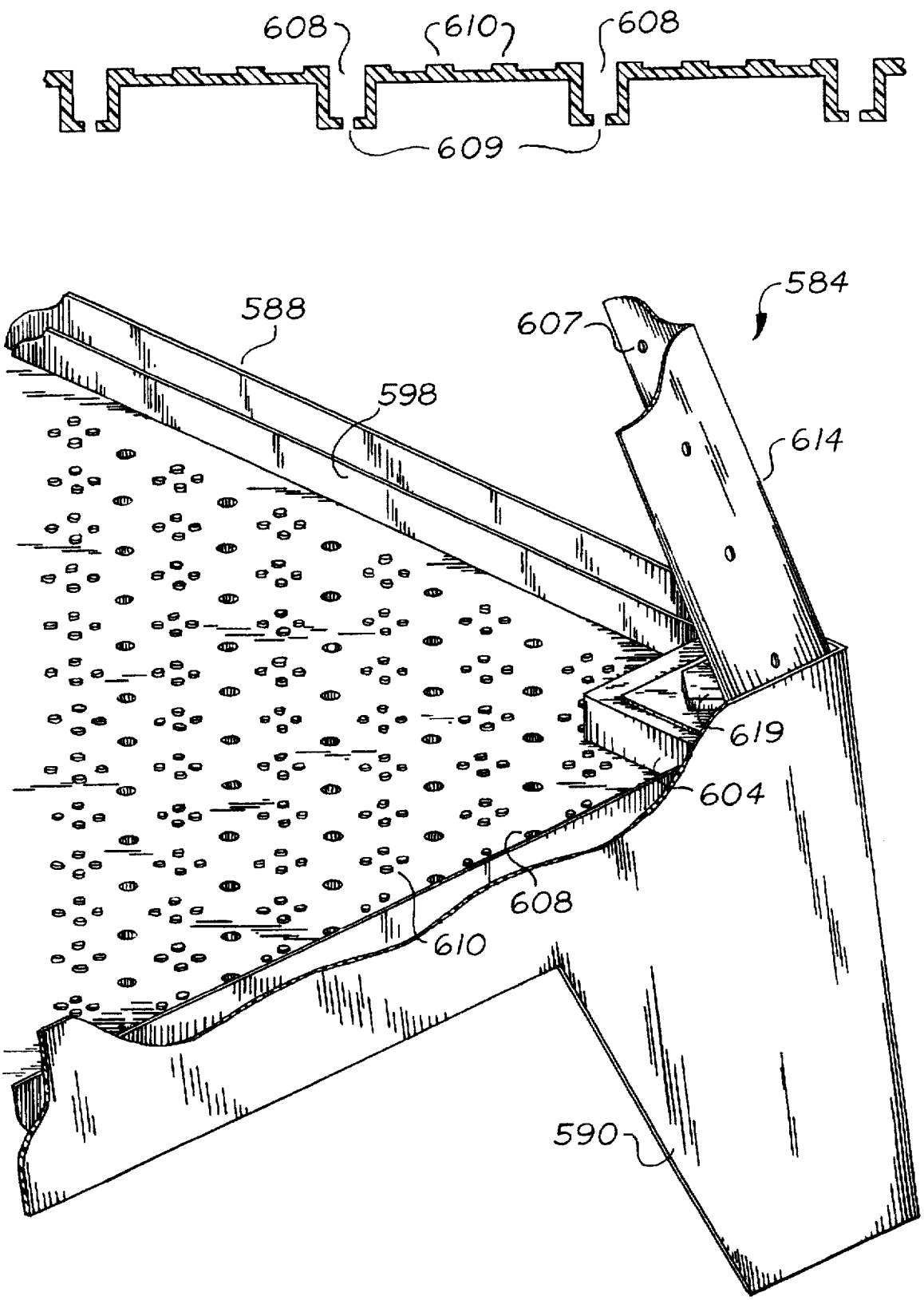
FIG. 54 is an oblique enlarged view of the building toy grid and corner structure of the water toy attachment shown in FIG. 52.

The gardener 462 can be made in a virtually unlimited number of shapes and sizes some of which are shown in FIG. 45 and include but are not limited to: the square 484, the rectangular 486, the elbow shaped 488, ½ doughnut shaped 490, square units that fit round basins 10 and gardeners with various height walls for use as terraiums, spice gardens and the like. The gardener 462 and basin 10 can be placed on surfaces, attached to surfaces or hung using the optional handle 576 or hangers 578 and 580 that slip into two of the four hanger keys 470 provided along the top rim 468 of the gardener 462. For ground based usage the gardener 462 rotates 360 degrees by lightly depressing the latches 162 and rotating. (The wicks/legs 258 extending below the gardener 462 rotate around the valve and miss the Basin snorkle.) Vent slots 476 through the horizontal surfaces of the bottom of the gardener 462 allow air movement through the basin 10 and up through the gardener 462. The user may adjust the amount of air flow by rotating the gardener 462 to allow the desired vent gap.

The gardener can be divided into 2, 3 or 4 sections using the reversible interlocking divider panels 480 that come in half panel 477 or the quarter panel 479 and snap into the slots 560 on the gardener floor 481 and the ARP divider locking slot 472 on the rim 468 and rest in the ARP/divider stabilizer channel 508 hook on to the divider catch 556 and in the case of the quarter panels 479 have a reversable center catch 558 to allow the quarter panel to be placed on the opposite side of the half panel 477. FIG. 49 shows the ARP center catch detail 562 and the side catch detail 564. The key component to the ARPs are its air slots 512 which do the pruning, the wings 514 steer roots into the ARP and the base 516 seals the area above the gardener floor while the ARP punch base 518 is tapered and sharp enough and strengthened by the base 516 sufficiently to punch through the gardener floor. The dividers 480 completely separate the sections so that different plants with different requirements can all self water and fertilize at their respective rates in different compartments of the same container. Plants can be started as seeds or seedlings and when their growth exceeds the size of their container they can be easily moved and transplanted.

The gardener 462 can be turned into an air root pruning (ARP) container by using up to five ARP inserts which come in a wall mounting version 482 and a center column version 483. The since abandoned Air Root Pruning Container U.S. Pat. No. 4,510,712 is incorporated by reference in its entirety into this disclosure. The said root pruners are tabular square vented tubes with wings that snap into the ARP insertion knockouts 478 on the gardener floor 481. The wall version ARP 482 seat into the gardener rim 468 using seating tabs on their top out facing edge immediately opposite the divider slot 511 on the ARP head 500 through which passes the ARP top opening 504 through which passes air from the basin 10. Lateral bending prevention and sealing are provided by the stabilizing rib 506 that fits into the divider slots 511, and structural support is also lent by the divider stabilizer channel tat accepts the dividers. The column version of the ARP 483 sits in the center of the gardener and is held in place by its locking tabs 524 that hold it to the floor. The column head 520 is used to pull the ARP out of the gardener and like the wall version air escapes the ARP column version through the column head opening 522. The ARP inserts can also be used with their own set of reversible interlocking divider panels which are identical to the standard dividers except narrower. The divider hooks into and is held in place by the divider catch 510. When used in the preferred embodiment of the attachment there are 24 ARP directional surfaces available to the plant roots which far exceeds the original ARP patent of 8 ARP directional surfaces. Also the ARPs (by their nature) function as an excellent areation means for the gardener 462. The ARPs and the dividers can be used in any combination desired. As roots grow into the ARP over time the user may wish to clean them out and may do so with the manual ARP cutter tool 526. The user grasps the tool by the handle 528 and then positions the cutting edge 530 over the ARP and pushes down thereby cutting the roots. Upon being pulled out of the ARPs the interior extraction barbs 532 on the inside of the cutter help gasp the cut roots and lift them out. The ARP vacuum attachment 534 consisting of a vacuum adapter 536, vacuum attachment head 540, screen housing 542, vacuum neck 548, vacuum cutting nozzel 550 and the hose to vacuum 554 is a portable unit the user can carry around to clean ARPs (especially in commercial situations) to quickly clean and extract material from inside the ARPs.

The gardener 462 can be made of clear plastic and covered with an opaque sleeve or decorative covers of wood 568 or faux rock 570. This will allow the user to determine the extent of root binding and thereby optimize transplant timing and subsequently plant growth. Also various additional accessories such as evaporation covers 574, decorative exterior covers, protective trays 572, detachable lighting 386, trellaces 580 and various hangers 576 and 578 fit the gardener 462.

The gardener/basin 462 can also be combined with the bury bucket 566 to produce a unique ground level, self-maintaining planter. The user buries the bury bucket to its rim, hangs the matching gardener/basin 462 into it and connects it to drip line 56 through the ports provided. For desert environments this would allow absolute water control and conservation for plant purposes. For cold climates it allows for quick removal of plants and their subsequent return. For commercial purposes it would allow replacement of overgrown or deprived plants rather than replanting. Particularly useful in malls and other large buildings requiring intensive plant maintenance in light deprived environments. Both the gardener 462 and the bury bucket 566 stack and nest at less than 10% of their height which allows enhanced storage and shipping.

By mounting the optional heater 132 in the basin 10 and connecting the ARP equipped gardener 462, the user can create a frost resistant growing container. When used with the ARPs the gardener 462 is able to 'smoke stack' warm air above the heated water in the basin 10 and up through the gardener ARPs and up through and around the plant foliage above. By slightly timing the gardener the user can adjust the vents 70 to create the desired venturi effect and modify the airflow based on the depth of freeze anticipated. Of course, if it gets too cold the user can always pick the gardener 462 up without or without the basin 10 and move it to shelter.

The water toy attachment 584 (water toy) when attached to the Basin becomes a multi-use water toy and educational tool. The user can build a series of chutes, slides, falls, hoses, wheels, lifts and an endless list of gadgets all of them powered or operated by the gravity fed water from the upper tank 624 or a self contained re-circulating pump 138. Similar in style to conceptual artist Rube Goldbergs creations, the user will have virtually unlimited potential for building different water powered devices and sculptures. For kids the works is a toy, for adults it is kinetic art.

The water toy 584 works as a platform for two existing very popular building toys; specifically the K'KNEX by Connector Set Toy Company and LEGO building blocks by LEGO Systems Inc. Kids can use their K'NEX and LEGO toys to build on the platform or building tray 598. The combinations are endless. The toy would also be the first and so far only water oriented application of these two very popular toys that uses water.

The Water Toy is made entirely of injection molded plastic and snaps together without the use of tools. The user places the toy attachment 584 onto te basin 10 by matching the gardener seat rim 586 and the basin attachment seating rim 74 and rotating the attachment until the two opposing latches 164 engage the basin vent/latch ports 70. The water toy base 580 is reinforced with reinforcing ribs 596 to strengthen it. The water toy 584 has base legs 590 as part of the base through which pass bolt holes 604 accept the tower bolts 618 (4 each) to stabilize the structure and tie the entire structure together, especially when it is covered with building hardware. In the center of building tray 598 is the drainage hole 600 for water to pass through into the basin 10. The building tray 598, and the entire tower 612, consisting of; tower legs 614, tower bracing 616 and water tank platform are covered with 6.50 mm holes 607, 6.25 mm posts 606, 6.50 mm wells 608 and 4.50 mm relief studs 610 arranged in a pattern and designed to accept the K'NEX and LEGO components. The wells 608 have on their bottom surfaces 2.00 mm drain holes 609 to allow the passage of water through them. The bottoms of the tower legs 614 have holes 594 in them that the bolts 618 pass through the base 588 to tie the unit firmly together.

Water is delivered to the base by pressurized water line 56, through the valve 14 and up to the water/pressure tank 624 which is held in place by the platform tank seating rim 622. The user can activate a series of valves including the output 626, input 628 and water tank air supply 630 valve which has a matching air bleeder 632 to initiate operation of gravity fed and powered devices. As water pours down the various devices it is collected by the base and redirected into the basin 10. The user can utilize an optional low voltage recirculating pump 138 to provide for continuous operation or can, during outdoor use, simply let the water overflow or be splashed around.

The water toy can be made in many different shapes and sizes and a virtually infinite number of accessories and toys can be made to fit or be used with the water toy.

From the foregoing description, one skilled in the art can easily ascertain the essential characteristics of this invention and, without departing from the spirit and scope thereof, can make various changes and modifications of the invention to adapt it to various usages and conditions.

| List of Reference numbers | |
|---|---|
| 10 | Basin (complete) |
| 12 | Utility bracket |
| 13 | Adjusting screw spring |
| 14 | Valve |
| 15 | Valve adjusting screw |
| 16 | Basin body (without utility bracket) |
| 18 | External fluid line port |
| 20 | Fluid supply channel |
| 22 | Internal fluid port |
| 24 | Snorkle cap |
| 26 | Basin snorkle body |
| 28 | Basin snorkle support rib |
| 30 | Utility snorkle debris trap |
| 32 | Utility snorkle |
| 34 | Utility air channel |
| 36 | Internal air port |
| 38 | External drain line port |
| 40 | Internal utility drain line port |
| 42 | Internal basin drain line port |
| 44 | Tear out drain line tab |
| 46 | Insert x thread fittings |
| 48 | Spring clamp |
| 50 | Quick disconnect fitting |
| 54 | Quick disconnect with auto shut off |
| 56 | Fluid delivery line |
| 58 | Fluid supply |
| 60 | Drain discharge line |
| 62 | Drain regulating valve |
| 64 | Basin feet |
| 66 | Basin feet/bottom reinforcing ribs |
| 68 | Basin hold-down tabs |
| 69 | Utility access cutouts |
| 70 | Basin vent/latch ports |
| 72 | Basin rim |
| 74 | Attachment seating rim |
| 76 | Basin stacking support |
| 78 | Fluid level sight glass |
| 80 | Valve mounting flange |
| 82 | Retention tabs |
| 84 | Retention tab compression cam |
| 86 | Retention tab stop |
| 88 | Fluid gasket trough |
| 90 | Air gasket trough |
| 92 | Air trough |

-continued

List of Reference numbers

| | |
|---|---|
| 94 | Gasket retention rings |
| 96 | Fluid isolating gasket |
| 98 | Air isolating gasket |
| 100 | Valve base |
| 101 | Valve base seating port |
| 104 | Valve base fluid port(liquid inlet) |
| 106 | Valve base air(gas)port |
| 108 | Valve base compression cam |
| 110 | Manual operation insertion plug |
| 112 | Manual operation insertion plug finger key |
| 114 | Manual operation insertion plug cam |
| 116 | Multiple basin insertion plug |
| 118 | Multiple basin insertion plug fluid port |
| 120 | Basin drain screen |
| 122 | Square basin |
| 124 | Rectangular basin |
| 126 | Doughnut basin |
| 128 | Semi-circle basin |
| 130 | Corner basin |
| 132 | Heater |
| 134 | Heater male electrical terminals |
| 136 | Heater plug and cord |
| 138 | Submersible fluid pump |
| 140 | Pump water outlet |
| 142 | Fluid pump male electrical terminals |
| 144 | Pump plug and cord |
| 146 | Pump mounting tabs |
| 150 | Pot converter latch |
| 152 | Animal waterer latch |
| 154 | Underground spring latch |
| 156 | Bird bath latch |
| 158 | Humming bird feeder latch |
| 160 | Amphibian habitat latch |
| 162 | Gardener latch |
| 164 | Water toy latch |
| 166 | Pot converter attachment |
| 168 | Pot converter seating rim |
| 170 | Pot converter vent slots |
| 172 | Pot converter upper rim |
| 174 | Pot converter wick holes |
| 176 | Pot converter drainage elevation ribs |
| 178 | Pot converter support ribs |
| 180 | Ordinary plant pot |
| 182 | Ordinary wicks |
| 184 | Square pot converter |
| 186 | Rectangular pot converter |
| 187 | Quick wick with removable sleeve |
| 188 | Quick wick with dissolving sleeve |
| 190 | Removable sleeve |
| 192 | Removable sleeve head slits |
| 194 | Quick wick impermeable cover |
| 196 | Quick wick expanding sleeve |
| 198 | Dissolving sleeve |
| 204 | Dissolving sleeve tip hole |
| 206 | Quick wick dissolving right angle |
| 208 | Quick wick dissolving at insertion |
| 210 | Quick wick dissolving expanded |
| 211 | Water |
| 212 | Polyester/nylon wicking material |
| 214 | Roller wick |
| 216 | Expanding membrane |
| 218 | Wick wrapped in impermeable cover |
| 220 | Quick wick cross section |
| 222 | Waterer attachment |
| 224 | Waterer attachment seating rim |
| 228 | Waterer valve cover |
| 230 | Waterer snorkle clearance channel |
| 232 | Waterer water slots |
| 234 | Square waterer |
| 236 | Rectangular waterer |
| 238 | Waterer food accessory |
| 240 | Food accessory seating rim |
| 242 | Food accessory splash guard |
| 244 | Animal food |
| 246 | Bulk food container |
| 248 | Square waterer with food accessory |
| 250 | Rectangular waterer with bulk food accessory |
| 254 | Underground spring attachment |
| 256 | Underground spring seating rim |
| 258 | Dirt or media wicks |
| 260 | Underground spring vent slots |
| 262 | Underground spring air line |
| 264 | External snorkle |
| 266 | Support stake |
| 268 | External snorkle screen |
| 270 | Rectangular underground spring |
| 272 | Basin drain port air adapter |
| 274 | Basin air adapter hose |
| 276 | Basin snorkle air adapter cap |
| 278 | Ordinary large planter |
| 280 | Tree |
| 282 | Soil |
| 284 | Bird bath attachment |
| 286 | Bird bath seating rim |
| 288 | Bird bath perch |
| 289 | Platform/valve cover |
| 290 | Multi level bath floor |
| 292 | Bird bath water slots |
| 294 | Bird bath snorkle clearance channel |
| 296 | Bird bath accessory rim |
| 298 | Bird bath accessory rim support |
| 300 | Bird bath umbrella |
| 304 | Umbrella reinforcing disc |
| 306 | Hanging ring |
| 308 | Square bird bath |
| 310 | Bird bath pedestal embodiment |
| 312 | Bird bath post mount embodiment |
| 314 | Solar panels |
| 316 | Solar panel electric wire assembly |
| 317 | Solar electric basin terminal adapter |
| 318 | Shower supply line |
| 320 | Shower head |
| 322 | Fresh water trough |
| 324 | Water trough supply line |
| 326 | Water trough perch |
| 328 | Humming bird feeder attachment |
| 330 | Humming bird seating rim |
| 334 | Humming bird perch |
| 336 | Artificial flower |
| 338 | Humming bird wick hole |
| 340 | Wick cup |
| 342 | Wick cup external mounting cam |
| 344 | Wick cup inside valve mount |
| 346 | Wick cup cover with wick holes |
| 348 | Pressure bladder |
| 350 | Pressure bladder vessel |
| 351 | Bladder vessel cap |
| 354 | Bladder water line fitting |
| 356 | Bladder solution line fitting |
| 358 | Bladder air pressure relief valve |
| 360 | Solution bag |
| 362 | Collection tube |
| 364 | Collection tube screen |
| 366 | Humming bird food solution |
| 367 | Solution line |
| 368 | Vessel sight glass |
| 370 | Amphibian attachment |
| 372 | Amphibian seating rim |
| 376 | Amphibian rim top |
| 380 | Dome |
| 382 | Dome vent |
| 384 | Dome vent adjustment knob |
| 386 | Light |
| 388 | Plants |
| 390 | Plant area |
| 400 | Plant area ramps |
| 404 | Inner deck |
| 406 | Amphibian food bowl |
| 408 | Amphibian water bowl |
| 410 | Fresh water inlet nipple |
| 412 | Fresh water supply hole |
| 414 | Over flow hole |
| 416 | Over flow nipple |
| 418 | Amphibian pool floor |
| 420 | Amphibian pool vent slots |
| 422 | Amphibian ventilation slots |

-continued

List of Reference numbers

| | |
|---|---|
| 424 | Square amphibian habitat |
| 426 | Rectangular amphibian habitat |
| 428 | Small animal/bird cage attachment |
| 430 | Cage seating rim |
| 432 | Pull out tray |
| 434 | Pull out tray handle |
| 436 | Cage bottom |
| 438 | Cage food trough |
| 440 | Cage fresh water bowl |
| 442 | Fresh water bowl inlet |
| 444 | Fresh water bowl overflow |
| 446 | Cage upper attachment rim |
| 448 | Wire cage |
| 450 | Cage seating rim |
| 454 | Cage door |
| 456 | Cage hanging ring |
| 458 | Square cage |
| 460 | Rectangular cage |
| 462 | Gardener attachment |
| 464 | Gardener seating rim |
| 466 | Gardener bottom rim vent slots |
| 468 | Gardener top rim |
| 470 | Hanger keys |
| 472 | ARP/divider locking slot |
| 474 | ARP/divider groove |
| 476 | Vent slots on gardener bottom |
| 477 | Half divider |
| 478 | ARP insertion knockouts |
| 479 | Quarter divider |
| 480 | Gardener dividers |
| 481 | Gardener floor |
| 482 | Areating root pruners-wall |
| 483 | Areating root pruners-column |
| 484 | Square gardener |
| 486 | Rectangular gardener |
| 488 | Elbow shaped gardener |
| 490 | 1/2 doughnut gardener |
| 492 | Tree wrapped in gardeners |
| 494 | Square gardener that fits round basin |
| 496 | Short wall gardener |
| 498 | ARP gardener seating tab-wall |
| 500 | ARP head-wall |
| 504 | ARP-wall top opening |
| 506 | ARP-wall stabilizing rib |
| 508 | ARP divider stabilizer channel |
| 510 | ARP wall divider catch |
| 511 | Divider slot |
| 512 | ARP air slots |
| 514 | ARP wings |
| 516 | ARP base |
| 518 | ARP punch base |
| 520 | ARP-column head |
| 522 | ARP-column head opening |
| 524 | ARP-column locking tabs |
| 526 | Manual ARP cutter tool |
| 528 | Cutter handle |
| 530 | ARP cutter cutting edge |
| 532 | ARP extraction barbs |
| 534 | ARP vacuum attachment |
| 536 | Universal vacuum adapter |
| 538 | Vacuum attachment adapter |
| 540 | Vacuum attachment head |
| 542 | Screen housing |
| 544 | Vacuum screen |
| 546 | Vacuum collector |
| 548 | Vacuum neck |
| 550 | Vacuum cutting nozzel |
| 554 | Vacuum hose to vacuum |
| 556 | Wall divider catch |
| 558 | Reversible center catch |
| 560 | Divider air slot tabs |
| 562 | ARP center-catch detail |
| 564 | ARP side-catch detail |
| 566 | Bury bucket |
| 568 | Exterior cover-wood |
| 570 | Exterior cover-rock |
| 572 | Basin tray |
| 574 | Gardener top cover |

-continued

List of Reference numbers

| | |
|---|---|
| 576 | Carry handle |
| 578 | Hanger |
| 580 | Hanger trellis |
| 584 | Water toy |
| 586 | Water toy seating rim |
| 588 | Water toy base |
| 590 | Water toy base legs |
| 594 | Tower bolt holes |
| 596 | Toy base reinforcing ribs |
| 598 | Building tray |
| 600 | Tray drainage hole |
| 604 | Bolt holes |
| 606 | 6.25 mm posts |
| 607 | 6.50 mm holes |
| 608 | 6.500 mm wells |
| 609 | 2.00 mm drain hole |
| 610 | Relief stud pattern |
| 612 | Tower |
| 614 | Tower legs |
| 616 | Tower bracing |
| 618 | Tower bolt holes-feet |
| 620 | Tower platform |
| 622 | Tower platform tank seating rim |
| 624 | Water/pressure tank |
| 626 | Water tank output valve |
| 628 | Water tank inlet valve |
| 630 | Water tank air supply valve |
| 632 | Water tank bleeder knob |

We claim:

1. In an automatic filling and liquid level regulating device for dispensing liquid from a source thereof which is under pressure to a liquid using attachment when the latter is connected thereto and in liquid communication therewith, the device comprising:

(a) a liquid holding basin adapted as a reservoir for a volume of liquid to be dispensed therefrom to the liquid using attachment when connected to the basin and which has a closed bottom, at least one side wall, an open top and which comprises:

(i) inlet means adapted to connect the interior of the basin to the source of the liquid under pressure and to ambient air;

(ii) seating means (in the interior of the basin) for detachably mounting a fill valve to the basin;

(iii) connecting means for connecting the liquid using attachment to the basin; and (b) a fill valve with an adjustable diaphragm for maintaining the volume of liquid in the basin at a selected liquid level line, which is detachably mounted in the basin between the inlet means and the interior of the basin at a position which leaves an air space above the top of the liquid when the basin is filled with a volume of liquid to the selected liquid level line, which fill valve comprises:

(i) means for detachably mounting the fill valve in the basin between the inlet means thereof and the interior of the basin and positioned below the selected liquid level line, between the top and the bottom of the basin, which leaves air space above the top of the liquid when the basin is filled with a volume of liquid to the selected liquid level line;

(ii) an interior cavity with a lower portion in liquid communication with the source of the liquid under pressure and which, when the valve is in its open position, is in liquid communication with the interior of the basin, and an upper portion;

(iii) a diaphragm in mechanical connection with means positioned in the upper portion of the interior cavity which reciprocally urges the valve into a closed position, in response to the weight of liquid in the basin above the diaphragm when the liquid is at the selected liquid level line, and releases the valve into an open position, in response to a drop in the level of the liquid in the basin below the selected liquid level line;

(iv) a liquid inlet port in liquid communication with the inlet means of the basin;

(v) a liquid outlet port providing liquid communication between the lower portion of the interior cavity and the interior of the basin for dispensing liquid from the fill valve into the basin when the valve is in its open position;

(vi) a gas inlet port in gas communication with the inlet means of the basin for maintaining the diaphragm of the fill valve at ambient air pressure;

the improvement wherein the basin is adapted for mounting thereon different liquid using attachments having different applications; wherein the connecting means thereof is adapted to mount a liquid using attachment on the open top of the basin; and the valve mounting means comprises seating means on an interior surface of the basin which is adapted to permit mounting the fill valve thereon and dismounting it therefrom in a single motion.

2. The device of claim 1 wherein the connecting means for mounting the liquid using attachment on the basin comprises a seating rim at the top of the basin which is adapted for mounting the liquid using attachment on the open top of the basin.

3. The device of claim 1 wherein the seating rim comprises a plurality of spaced slots adapted for use as latch ports for locking a liquid using attachment on the basin.

4. The device of claim 2 wherein the liquid using attachment is a plant container.

5. The device of claim 1 wherein the inlet means comprises a utility bracket which is water and air tight sealed to the bottom of the basin and which comprises a first conduit which provides gas communication between ambient air in the air space above the selected liquid level line of the basin and the diaphragm of the fill valve and a second conduit which provides liquid communication between the source of the liquid under pressure and the liquid inlet port of the fill valve.

6. The device of claim 1 wherein the basin comprises seating means in the bottom thereof, onto which the fill valve is liquid and air tight detachably mounted.

7. The device of claim 6 wherein the fill valve is rotatably mounted on the seating means.

8. The device of claim 1 which comprises a liquid using attachment adapted to be dismountably mounted on the basin in liquid communication with liquid in the basin when thus mounted and the basin is connected to the source of the liquid under pressure.

9. The device of claim 8 wherein a lower surface of the liquid using attachment is spaced from and above the selected liquid level line of the basin and the device comprises at least one liquid transfer means for transferring liquid from the basin to the liquid using attachment.

10. The device of claim 9 adapted as a gardening system for growing plants wherein the liquid using attachment is a plant container, the source of the liquid under pressure is water and the liquid transfer means comprises at least one wick extending downwardly from the plant container at least to the selected liquid level line when the plant container is mounted on the basin.

11. The device adapted as a gardening system of claim 10 wherein the liquid transfer means comprises a plurality of wicks.

12. The device adapted as a gardening system of claim 11 wherein the connecting means for mounting the plant container on the basin comprises a seating rim along the top of the basin; wherein each of the plurality of wicks is mounted on and extends from the bottom of the plant container and downwardly from the exterior surface thereof into the basin when the plant container is mounted on the basin; and wherein the basin has a series of spaced slots along the periphery thereof, proximate the upper rim thereof, which function both as air vents to the interior of the basin and as mounting latches for mounting the plant container on the basin and the plant container has a plurality of protruding members along the periphery of the lower end of the side wall thereof adapted to fit into the slots in the basin and thereby lock the plant container in a mounted position on the basin.

13. The device adapted as a gardening system of claim 12 wherein the plant container comprises at least one elongate vertical conduit which has multiple perforations in its wall through which plant roots can project when a plant is grown in the plant container and which thereby acts as an air root pruner.

14. The device adapted as a gardening system of claim 13 wherein a plurality of elongate vertical conduits are positioned proximate the interior surface of the side wall of the plant container in air communication with the air space above the level of the liquid in the basin when the plant container is mounted on the basin and the basin is filled with liquid to the selected liquid level line.

15. The device adapted as a gardening system of claim 12 wherein the plant container has a plurality of plant growing compartments defined by vertical partitions.

16. The device adapted as a gardening system of claim 15 wherein each vertical partition has an elongate vertical conduit positioned therein which is common to the growing compartments on opposite sides of the partition.

17. A method of providing water to a plant container containing growing medium and a plant growing therein, at a rate determined by the water content of the plant container, which comprises mounting a plant container as defined in claim 12, containing growing medium and a growing plant therein, to a basin as defined therein and connecting the basin to a source of water under pressure.

18. The device adapted as a gardening system of claim 10 wherein the at least one wick is mounted on and extends through the bottom of the plant container and downwardly from the exterior surface thereof into the basin when the plant container is mounted on the basin.

19. The device adapted as a gardening system of claim 18 wherein the connecting means for mounting the plant container on the basin comprises a seating rim on the top of the basin.

20. The device adapted as a gardening system of claim 10 wherein the plant container comprises at least one elongate conduit positioned proximate the interior surface of an outer wall thereof which has multiple perforations in the wall through which plant roots can project when a plant is grown in the plant container and which thereby acts as an air root pruner.

21. The device adapted as a gardening system of claim 20 wherein the plant container has a plurality of plant growing compartments defined by vertical partitions.

22. The device adapted as a gardening system of claim 21 wherein adjacent compartments have an air root pruner conduit which is common to both of the adjacent compartments and which is positioned in the vertical partition defining the adjacent compartments.

23. The device adapted as a gardening system of claim 10 wherein the plant container has an axially positioned air root pruner conduit whose perforations provide air communication with each of the plurality of compartments.

24. The device adapted as a gardening system of claim 10 wherein the inlet means is a member of a utility bracket which is water and air tight sealed to the bottom of the basin and which comprises a first conduit which provides gas communication between ambient air outside the basin and air space above the selected liquid level line of the basin and a second conduit which provides liquid communication between the source of the liquid under pressure and the liquid inlet port of the fill valve.

25. The device adapted as a gardening system of claim 10 wherein the basin has a slot in the periphery of a side wall thereof, proximate the top of the basin which is adapted for use as a latch port for locking the plant container on the basin.

26. The device adapted as a gardening system of claim 25 wherein the plant container has a protruding member along the periphery of the lower end of the side wall thereof which is adapted to fit into the slot in the basin and thereby lock the plant container in a mounted position on the basin.

27. A method of providing water to a water using attachment utilizing the automatic filling and liquid level regulating device of claim 1, at a rate determined by the water demand of the water using attachment, which comprises mounting the water using attachment on the basin of the device and connecting the device to a source of water under pressure.

28. A method of claim 27, wherein the water using attachment is a plant container containing at least one growing plant therein.

* * * * *